United States Patent
Keilers et al.

(10) Patent No.: US 9,365,203 B2
(45) Date of Patent: Jun. 14, 2016

(54) SYSTEMS AND METHODS FOR CONTROL OF TRANSMISSION AND/OR PRIME MOVER

(71) Applicant: Fallbrook Intellectual Property Company LLC, Cedar Park, TX (US)

(72) Inventors: Cyril Keilers, Round Rock, TX (US); David Lynn Rogers, Round Rock, TX (US); Eric Diehl, Austin, TX (US); Austin Orand, Austin, TX (US); Mark Edward Bartholomew, Round Rock, TX (US); Christopher M Vasiliotis, Austin, TX (US); Loren T McDaniel, Austin, TX (US); Jeremy Carter, Austin, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 14/464,245

(22) Filed: Aug. 20, 2014

(65) Prior Publication Data
US 2014/0365059 A1    Dec. 11, 2014

Related U.S. Application Data

(63) Continuation of application No. 13/054,767, filed as application No. PCT/US2009/052761 on Aug. 4, 2009, now Pat. No. 8,818,661.

(60) Provisional application No. 61/086,366, filed on Aug. 5, 2008.

(51) Int. Cl.
*B60W 10/105* (2012.01)
*B60W 10/08* (2006.01)
*F16H 61/664* (2006.01)

(52) U.S. Cl.
CPC ............ *B60W 10/105* (2013.01); *B60W 10/08* (2013.01); *F16H 61/6648* (2013.01);
(Continued)

(58) Field of Classification Search
CPC .............. B60W 10/08; B60W 10/105; B60W 2710/083; B60W 2510/081; F16H 61/6648; B60L 2240/421; B60L 2240/423; Y02T 10/642; B60K 6/543
USPC ................ 701/22, 51; 180/65.26, 65.21, 307, 180/65.1, 65.285
See application file for complete search history.

(56) References Cited

U.S. PATENT DOCUMENTS

| 719,595 A | 2/1903 | Huss |
| 1,121,210 A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

Office Action dated Aug. 23, 2006 from Japanese Patent Application No. 2000-517205.
(Continued)

*Primary Examiner* — Marthe Marc-Coleman
(74) *Attorney, Agent, or Firm* — Knobbe Martens Olson & Bear LLP

(57) ABSTRACT

Methods of controlling a prime mover and a continuously variable transmission (CVT) are described. The CVT has a group of spherical power adjusters. Each power adjuster has a tiltable axis of rotation. The methods may include optimizing a vehicle having a drive motor and a continuously variable transmission. The CVT has a plurality of spherical power adjusters, each power adjuster having a tiltable axis of rotation. The methods may include optimizing a drive system having a prime mover and a continuously variable transmission.

13 Claims, 23 Drawing Sheets

(52) U.S. Cl.
CPC ..... *B60L 2240/421* (2013.01); *B60L 2240/423* (2013.01); *B60W 2510/081* (2013.01); *B60W 2710/083* (2013.01); *Y02T 10/642* (2013.01)

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Samain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,978,439 A | 10/1934 | Sharpe |
| 2,030,203 A | 2/1936 | Gove et al. |
| 2,060,884 A | 11/1936 | Alain Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,586,725 A | 2/1952 | Henry |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 4,976,170 A | 12/1990 | Hayashi et al. |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |

(56) References Cited

U.S. PATENT DOCUMENTS

| | | |
|---|---|---|
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,194,052 A | 3/1993 | Ueda et al. |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,413,540 A | 5/1995 | Streib et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,683,322 A | 11/1997 | Meyerle |
| 5,690,346 A | 11/1997 | Keskitalo |
| 5,701,786 A | 12/1997 | Kawakami |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,819,864 A | 10/1998 | Koike et al. |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 5,995,895 A | 11/1999 | Watt et al. |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Koide et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,086,506 A | 7/2000 | Petersmann et al. |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,000,496 B2 | 2/2006 | Wessel et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B2 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |

(56) References Cited

U.S. PATENT DOCUMENTS

| | | |
|---|---|---|
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,770,674 B2 | 8/2010 | Miles et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,535,199 B2 | 9/2013 | Lohr et al. |
| 8,550,949 B2 | 10/2013 | Miller |
| 8,585,528 B2 | 11/2013 | Carter et al. |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,888,643 B2 | 11/2014 | Lohr et al. |
| 8,996,263 B2 | 3/2015 | Quinn et al. |
| 2001/0008192 A1 | 7/2001 | Morisawa |

(56) References Cited

U.S. PATENT DOCUMENTS

| | | |
|---|---|---|
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0128107 A1 | 9/2002 | Wakayama |
| 2002/0169051 A1 | 11/2002 | Oshidari |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0051375 A1 | 3/2004 | Uno |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0085979 A1 | 4/2005 | Carlson et al. |
| 2005/0184580 A1 | 8/2005 | Kuan et al. |
| 2005/0227809 A1 | 10/2005 | Bitzer et al. |
| 2006/0006008 A1 | 1/2006 | Brunemann et al. |
| 2006/0052204 A1 | 3/2006 | Eckert et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2007/0228687 A1 | 10/2007 | Parker |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2011/0088503 A1 | 4/2011 | Armstrong et al. |
| 2011/0127096 A1 | 6/2011 | Schneidewind |
| 2011/0184614 A1 | 7/2011 | Keilers et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0095977 A1 | 4/2013 | Smithson et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0337971 A1 | 12/2013 | Kostrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2015/0018154 A1 | 1/2015 | Thomassy |
| 2015/0039195 A1 | 2/2015 | Pohl et al. |
| 2015/0051801 A1 | 2/2015 | Quinn et al. |
| 2015/0072827 A1 | 3/2015 | Lohr et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1204991 | 1/1999 |
| CN | 1283258 | 2/2001 |
| CN | 1300355 | 6/2001 |
| CN | 1474917 | 2/2004 |
| CN | 1654858 | 8/2005 |
| CN | 2714896 | 8/2005 |
| CN | 1860315 | 11/2006 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 4120540 C1 | 11/1992 |
| DE | 19851738 | 5/2000 |
| DE | 10155372 A1 | 5/2003 |
| DE | 10261372 A1 | 7/2003 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |
| EP | 0 976 956 | 2/2000 |
| EP | 1 010 612 | 6/2000 |
| EP | 1 136 724 | 9/2001 |
| EP | 1 366 978 | 3/2003 |
| EP | 1 362 783 | 11/2003 |
| EP | 1 433 641 | 6/2004 |
| EP | 1 452 441 | 9/2004 |
| EP | 1 518 785 | 3/2005 |
| EP | 1 624 230 | 2/2006 |
| EP | 1 811 202 | 7/2007 |
| FR | 620375 | 4/1927 |
| FR | 2460427 | 1/1981 |

(56) References Cited

FOREIGN PATENT DOCUMENTS

| | | |
|---|---|---|
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035482 | 6/1980 |
| GB | 2080452 | 8/1982 |
| JP | 44-1098 | 1/1944 |
| JP | 38-025315 | 11/1963 |
| JP | 41-003126 | 2/1966 |
| JP | 42-2843 | 2/1967 |
| JP | 42-2844 | 2/1967 |
| JP | 47-207 | 6/1972 |
| JP | 47-000448 | 7/1972 |
| JP | 47-29762 | 11/1972 |
| JP | 48-54371 | 7/1973 |
| JP | 49-12742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-223555 | 10/1991 |
| JP | 04-166619 | 6/1992 |
| JP | 04-272553 | 9/1992 |
| JP | 04-327055 | 11/1992 |
| JP | 4-351361 | 12/1992 |
| JP | 5-87154 | 4/1993 |
| JP | 52-35481 | 9/1993 |
| JP | 06-050169 | 2/1994 |
| JP | 6-50358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-170706 | 7/1996 |
| JP | 08-270772 | 10/1996 |
| JP | 09-024743 | 1/1997 |
| JP | 09-089064 | 3/1997 |
| JP | 10-061739 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-511621 | 11/1998 |
| JP | 41-1063130 | 3/1999 |
| JP | 11-091411 | 4/1999 |
| JP | 11-257479 | 9/1999 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-521109 | 11/2001 |
| JP | 2002-147558 | 5/2002 |
| JP | 2002-250421 | 6/2002 |
| JP | 2002-291272 | 10/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003 194206 | 7/2003 |
| JP | 2003-194207 | 7/2003 |
| JP | 2003-524119 | 8/2003 |
| JP | 2003-336732 | 11/2003 |
| JP | 2004-011834 | 1/2004 |
| JP | 2004-162652 | 6/2004 |
| JP | 2004-189222 | 7/2004 |
| JP | 8-247245 | 9/2004 |
| JP | 2004-526917 | 9/2004 |
| JP | 2005-003063 | 1/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2008-002687 | 1/2008 |
| JP | 03-149442 | 1/2009 |
| JP | 2010-069005 | 4/2010 |
| JP | 2007-535715 | 7/2012 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 03/086849 | 10/2003 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/091503 | 8/2006 |
| WO | WO 2007/077502 | 7/2007 |
| WO | WO2007106870 A2 * | 9/2007 |
| WO | WO 2008/078047 | 7/2008 |
| WO | WO 2008/095116 | 8/2008 |
| WO | WO 2008/154437 | 12/2008 |
| WO | WO 2010/017242 | 2/2010 |
| WO | WO 2010/135407 | 11/2010 |
| WO | WO 2011/101991 | 8/2011 |
| WO | WO 2012/030213 | 3/2012 |
| WO | WO 2013/112408 | 8/2013 |

OTHER PUBLICATIONS

Supplementary European Search Report dated Apr. 1, 2009, for European Application No. 04715691.4, filed Feb. 7, 2004.
Office Action dated Feb. 17, 2010 from Japanese Patent Application No. 2009-294086.
Extended European Search Report dated Feb. 7, 2012 for European Patent Application No. 11184545.9.

(56) References Cited

OTHER PUBLICATIONS

Japanese Office Action dated Jun. 19, 2012 for Japanese Patent Application No. 2009-294348.
Office Action dated Sep. 6, 2011 for Japanese Patent Application No. 2007-535715.
Taiwan Search Report and Preliminary Notice of First Office Action dated Oct. 30, 2008 for Taiwanese Patent Application No. 094134761.
International Search Report and Written Opinion dated Dec. 20, 2006 from International Patent Application No. PCT/US2006/033104, filed on Aug. 23, 2006.
Office Action dated Aug. 12, 2013 for Taiwanese Patent Application No. 095143152.
Office Action dated Jun. 28, 2011 from Japanese Patent Application No. 2009-518168.
Office Action dated Feb. 18, 2014 in Japanese patent application No. 2012-095839.
International Search Report and Written Opinion dated Apr. 16, 2008, for PCT Application No. PCT/US2007/023315, filed Nov. 6, 2007.
Preliminary Notice of First Office Action dated Sep. 14, 2013 in Taiwan patent application No. 96142183.
International Search Report and Written Opinion dated Feb. 2, 2010 from International Patent Application No. PCT/US2008/068929, filed on Jan. 7, 2008.
International Search Report and Written Opinion dated Aug. 6, 2009 for PCT Application No. PCT/US2009/035540.
International Search Report and Written Opinion dated Jan. 25, 2010 from International Patent Application No. PCT/US2009/052761, filed on Aug. 4, 2009.
Japanese Office Action dated Aug. 6, 2013 for Japanese Patent Application No. 2011-524950.
International Preliminary Report on Patentability dated Oct. 27, 2013 for PCT Application No. PCT/US2012/031884.
Thomassy: An Engineering Approach to Simulating Traction EHL. CVT-Hybrid International Conference Mecc/Maastricht/The Netherlands, Nov. 17-19, 2010, p. 97.
Office Action dated Aug. 14, 2013 for U.S. Appl. No. 13/054,767.
Office Action dated Jan. 8, 2014 for U.S. Appl. No. 13/054,767.
Office Action dated Jul. 24, 2015 in Canadian Patent Application No. 2,732,668.

* cited by examiner

FIG. 13

| Min Act Pos | 40 | | RPM | 1500 | | | | | | | |
|---|---|---|---|---|---|---|---|---|---|---|---|
| Max Act Pos | 442 | | | | | | | | | | |
| | | | | | | | | | | Shift Curves | |
| | | | | | | | | | | Act Position (0-462) | |
| Number | MPH | Wheel Speed (rad/s) | RPM | Ideal GR old | Ideal GR | GR | Revs | Test | Perf | Econ | Drag Race | Step |
| 0 | 0 | 0.00 | 1500 | 0 | 0.00 | 0.51 | 0.00 | 40 | 40 | 40 | 40 | 40 |
| 1 | 0.2 | 0.05 | 1500 | 0.03 | 0.02 | 0.51 | 0.00 | 40 | 40 | 40 | 40 | 40 |
| 2 | 0.4 | 0.10 | 1500 | 0.06 | 0.04 | 0.51 | 0.00 | 40 | 40 | 40 | 40 | 40 |
| 3 | 0.6 | 0.15 | 1500 | 0.08 | 0.06 | 0.51 | 0.00 | 40 | 40 | 40 | 40 | 40 |
| 4 | 0.8 | 0.20 | 1500 | 0.11 | 0.08 | 0.51 | 0.00 | 40 | 40 | 40 | 43 | 40 |
| 5 | 1 | 0.24 | 1500 | 0.14 | 0.10 | 0.51 | 0.00 | 40 | 40 | 40 | 47 | 40 |
| 6 | 1.2 | 0.29 | 1500 | 0.17 | 0.12 | 0.51 | 0.00 | 40 | 40 | 40 | 50 | 40 |
| 7 | 1.4 | 0.34 | 1500 | 0.19 | 0.14 | 0.51 | 0.00 | 40 | 40 | 40 | 54 | 40 |
| 8 | 1.6 | 0.39 | 1500 | 0.22 | 0.16 | 0.51 | 0.00 | 40 | 40 | 40 | 58 | 40 |
| 9 | 1.8 | 0.44 | 1500 | 0.25 | 0.18 | 0.51 | 0.00 | 40 | 40 | 40 | 61 | 40 |
| 10 | 2 | 0.49 | 1500 | 0.28 | 0.20 | 0.51 | 0.00 | 40 | 40 | 40 | 65 | 40 |
| 11 | 2.2 | 0.54 | 1500 | 0.31 | 0.22 | 0.51 | 0.00 | 40 | 40 | 40 | 69 | 40 |
| 12 | 2.4 | 0.59 | 1500 | 0.33 | 0.24 | 0.51 | 0.00 | 40 | 40 | 40 | 72 | 40 |
| 13 | 2.6 | 0.64 | 1500 | 0.36 | 0.26 | 0.51 | 0.00 | 40 | 40 | 40 | 76 | 40 |
| 14 | 2.8 | 0.68 | 1500 | 0.39 | 0.29 | 0.51 | 0.00 | 40 | 40 | 40 | 80 | 40 |
| 15 | 3 | 0.73 | 1500 | 0.42 | 0.31 | 0.51 | 0.00 | 40 | 40 | 40 | 84 | 40 |
| 16 | 3.2 | 0.78 | 1500 | 0.44 | 0.33 | 0.51 | 0.00 | 40 | 45 | 40 | 87 | 100 |
| 17 | 3.4 | 0.83 | 1500 | 0.47 | 0.35 | 0.51 | 0.00 | 40 | 50 | 40 | 91 | 100 |
| 18 | 3.6 | 0.88 | 1500 | 0.5 | 0.37 | 0.51 | 0.00 | 40 | 55 | 40 | 95 | 100 |
| 19 | 3.8 | 0.93 | 1500 | 0.53 | 0.39 | 0.51 | 0.00 | 40 | 60 | 40 | 98 | 100 |
| 20 | 4 | 0.98 | 1500 | 0.56 | 0.41 | 0.51 | 0.00 | 40 | 65 | 40 | 102 | 100 |
| 21 | 4.2 | 1.03 | 1500 | 0.58 | 0.43 | 0.51 | 0.00 | 40 | 70 | 40 | 106 | 100 |
| 22 | 4.4 | 1.08 | 1500 | 0.61 | 0.45 | 0.51 | 0.00 | 40 | 75 | 40 | 109 | 100 |
| 23 | 4.6 | 1.12 | 1500 | 0.64 | 0.47 | 0.51 | 0.00 | 40 | 80 | 50 | 113 | 100 |
| 24 | 4.8 | 1.17 | 1500 | 0.67 | 0.49 | 0.51 | 0.00 | 40 | 85 | 60 | 117 | 100 |
| 25 | 5 | 1.22 | 1500 | 0.69 | 0.51 | 0.51 | 0.00 | 40 | 90 | 70 | 121 | 100 |
| 26 | 5.2 | 1.27 | 1500 | 0.72 | 0.53 | 0.53 | 0.06 | 40 | 95 | 80 | 124 | 100 |
| 27 | 5.4 | 1.32 | 1500 | 0.75 | 0.55 | 0.55 | 0.11 | 40 | 100 | 90 | 128 | 100 |
| 28 | 5.6 | 1.37 | 1500 | 0.78 | 0.57 | 0.57 | 0.15 | 40 | 105 | 95 | 132 | 100 |
| 29 | 5.8 | 1.42 | 1500 | 0.81 | 0.59 | 0.59 | 0.20 | 50 | 110 | 100 | 135 | 100 |
| 30 | 6 | 1.47 | 1500 | 0.83 | 0.61 | 0.61 | 0.24 | 61 | 115 | 105 | 139 | 100 |
| 31 | 6.2 | 1.52 | 1500 | 0.86 | 0.63 | 0.63 | 0.28 | 71 | 120 | 110 | 143 | 100 |
| 32 | 6.4 | 1.56 | 1500 | 0.89 | 0.65 | 0.65 | 0.32 | 82 | 125 | 115 | 146 | 100 |
| 33 | 6.6 | 1.61 | 1500 | 0.92 | 0.67 | 0.67 | 0.36 | 92 | 130 | 120 | 150 | 100 |
| 34 | 6.8 | 1.66 | 1500 | 0.94 | 0.69 | 0.69 | 0.40 | 103 | 135 | 125 | 154 | 100 |
| 35 | 7 | 1.71 | 1500 | 0.97 | 0.71 | 0.71 | 0.45 | 114 | 140 | 130 | 158 | 100 |
| 36 | 7.2 | 1.76 | 1500 | 1 | 0.73 | 0.73 | 0.49 | 124 | 145 | 135 | 161 | 200 |
| 37 | 7.4 | 1.81 | 1500 | 1.03 | 0.75 | 0.75 | 0.53 | 134 | 150 | 140 | 165 | 200 |
| 38 | 7.6 | 1.86 | 1500 | 1.06 | 0.77 | 0.77 | 0.57 | 144 | 155 | 145 | 170 | 200 |
| 39 | 7.8 | 1.91 | 1500 | 1.08 | 0.79 | 0.79 | 0.61 | 154 | 160 | 150 | 175 | 200 |
| 40 | 8 | 1.96 | 1500 | 1.11 | 0.81 | 0.81 | 0.64 | 163 | 165 | 155 | 180 | 200 |
| 41 | 8.2 | 2.00 | 1500 | 1.14 | 0.83 | 0.83 | 0.68 | 173 | 170 | 160 | 185 | 200 |
| 42 | 8.4 | 2.05 | 1500 | 1.17 | 0.86 | 0.86 | 0.71 | 182 | 175 | 165 | 190 | 200 |

| Min Act Pos | 40 | | RPM | 1500 | | | | | | | | |
|---|---|---|---|---|---|---|---|---|---|---|---|---|
| Max Act Pos | 442 | | | | | | | | | | | |
| | | | | | | | | | | Shift Curves | | |
| | | | | | | | | | | Act Position (0-462) | | |
| FIG. 13 (cont.) | Number | MPH | Wheel Speed (rad/s) | RPM | Ideal GR old | Ideal GR | GR | Revs | Test | Perf | Econ | Drag Race | Step |
| | 43 | 8.6 | 2.10 | 1500 | 1.19 | 0.88 | 0.88 | 0.75 | 192 | 180 | 170 | 195 | 200 |
| | 44 | 8.8 | 2.15 | 1500 | 1.22 | 0.90 | 0.90 | 0.79 | 201 | 185 | 175 | 200 | 200 |
| | 45 | 9 | 2.20 | 1500 | 1.25 | 0.92 | 0.92 | 0.82 | 210 | 190 | 180 | 205 | 200 |
| | 46 | 9.2 | 2.25 | 1500 | 1.28 | 0.94 | 0.94 | 0.86 | 219 | 195 | 185 | 210 | 200 |
| | 47 | 9.4 | 2.30 | 1500 | 1.3 | 0.96 | 0.96 | 0.89 | 228 | 200 | 190 | 215 | 200 |
| | 48 | 9.6 | 2.35 | 1500 | 1.33 | 0.98 | 0.98 | 0.93 | 237 | 205 | 195 | 220 | 200 |
| | 49 | 9.8 | 2.40 | 1500 | 1.36 | 1.00 | 1.00 | 0.96 | 245 | 210 | 200 | 225 | 200 |
| | 50 | 10 | 2.44 | 1500 | 1.39 | 1.02 | 1.02 | 0.99 | 252 | 215 | 205 | 230 | 200 |
| | 51 | 10.2 | 2.49 | 1500 | 1.42 | 1.04 | 1.04 | 1.02 | 261 | 220 | 210 | 235 | 200 |
| | 52 | 10.4 | 2.54 | 1500 | 1.44 | 1.06 | 1.06 | 1.05 | 269 | 225 | 215 | 240 | 200 |
| | 53 | 10.6 | 2.59 | 1500 | 1.47 | 1.08 | 1.08 | 1.08 | 277 | 230 | 220 | 245 | 200 |
| | 54 | 10.8 | 2.64 | 1500 | 1.5 | 1.10 | 1.10 | 1.11 | 285 | 235 | 225 | 250 | 200 |
| | 55 | 11 | 2.69 | 1500 | 1.53 | 1.12 | 1.12 | 1.14 | 292 | 240 | 225 | 255 | 200 |
| | 56 | 11.2 | 2.74 | 1500 | 1.55 | 1.14 | 1.14 | 1.17 | 300 | 245 | 225 | 260 | 300 |
| | 57 | 11.4 | 2.79 | 1500 | 1.58 | 1.16 | 1.16 | 1.20 | 307 | 250 | 225 | 265 | 300 |
| | 58 | 11.6 | 2.84 | 1500 | 1.61 | 1.18 | 1.18 | 1.23 | 314 | 255 | 225 | 270 | 300 |
| | 59 | 11.8 | 2.88 | 1500 | 1.64 | 1.20 | 1.20 | 1.25 | 320 | 260 | 225 | 275 | 300 |
| | 60 | 12 | 2.93 | 1500 | 1.67 | 1.22 | 1.22 | 1.28 | 327 | 265 | 225 | 280 | 300 |
| | 61 | 12.2 | 2.98 | 1500 | 1.69 | 1.24 | 1.24 | 1.31 | 334 | 270 | 225 | 285 | 300 |
| | 62 | 12.4 | 3.03 | 1500 | 1.72 | 1.26 | 1.26 | 1.33 | 341 | 275 | 225 | 290 | 300 |
| | 63 | 12.6 | 3.08 | 1500 | 1.75 | 1.28 | 1.28 | 1.36 | 347 | 280 | 225 | 295 | 300 |
| | 64 | 12.8 | 3.13 | 1500 | 1.78 | 1.30 | 1.30 | 1.38 | 354 | 285 | 225 | 300 | 300 |
| | 65 | 13 | 3.18 | 1500 | 1.8 | 1.32 | 1.32 | 1.41 | 360 | 290 | 225 | 305 | 300 |
| | 66 | 13.2 | 3.23 | 1500 | 1.83 | 1.34 | 1.34 | 1.43 | 366 | 295 | 225 | 308 | 300 |
| | 67 | 13.4 | 3.28 | 1500 | 1.86 | 1.36 | 1.36 | 1.45 | 372 | 300 | 225 | 311 | 300 |
| | 68 | 13.6 | 3.32 | 1500 | 1.89 | 1.38 | 1.38 | 1.47 | 377 | 305 | 225 | 313 | 300 |
| | 69 | 13.8 | 3.37 | 1500 | 1.92 | 1.40 | 1.40 | 1.50 | 383 | 310 | 225 | 316 | 300 |
| | 70 | 14 | 3.42 | 1500 | 1.94 | 1.43 | 1.43 | 1.52 | 388 | 315 | 225 | 319 | 300 |
| | 71 | 14.2 | 3.47 | 1500 | 1.97 | 1.45 | 1.45 | 1.54 | 393 | 320 | 225 | 322 | 300 |
| | 72 | 14.4 | 3.52 | 1500 | 2 | 1.47 | 1.47 | 1.56 | 399 | 325 | 225 | 325 | 300 |
| | 73 | 14.6 | 3.57 | 1500 | 2.03 | 1.49 | 1.49 | 1.58 | 404 | 327 | 225 | 327 | 300 |
| | 74 | 14.8 | 3.62 | 1500 | 2.05 | 1.51 | 1.51 | 1.60 | 409 | 327 | 225 | 330 | 300 |
| | 75 | 15 | 3.67 | 1500 | 2.08 | 1.53 | 1.53 | 1.62 | 413 | 327 | 225 | 333 | 300 |
| | 76 | 15.2 | 3.72 | 1500 | 2.11 | 1.55 | 1.55 | 1.63 | 418 | 327 | 225 | 336 | 400 |
| | 77 | 15.4 | 3.76 | 1500 | 2.14 | 1.57 | 1.57 | 1.65 | 422 | 327 | 225 | 339 | 400 |
| | 78 | 15.6 | 3.81 | 1500 | 2.17 | 1.59 | 1.59 | 1.67 | 426 | 327 | 225 | 341 | 400 |
| | 79 | 15.8 | 3.86 | 1500 | 2.19 | 1.61 | 1.61 | 1.68 | 431 | 327 | 225 | 344 | 400 |
| | 80 | 16 | 3.91 | 1500 | 2.22 | 1.63 | 1.63 | 1.70 | 435 | 327 | 225 | 347 | 400 |
| | 81 | 16.2 | 3.96 | 1500 | 2.25 | 1.65 | 1.65 | 1.71 | 438 | 327 | 225 | 350 | 400 |
| | 82 | 16.4 | 4.01 | 1500 | 2.28 | 1.67 | 1.67 | 1.73 | 442 | 327 | 225 | 353 | 400 |
| | 83 | 16.6 | 4.06 | 1500 | 2.3 | 1.69 | 1.69 | 1.74 | 446 | 327 | 225 | 355 | 400 |
| | 84 | 16.8 | 4.11 | 1500 | 2.33 | 1.71 | 1.71 | 1.76 | 449 | 327 | 225 | 358 | 400 |
| | 85 | 17 | 4.16 | 1500 | 2.36 | 1.73 | 1.73 | 1.77 | 453 | 327 | 225 | 361 | 400 |

| Min Act Pos | 40 | | RPM | 1500 | | | | | | | | |
|---|---|---|---|---|---|---|---|---|---|---|---|---|
| Max Act Pos | 442 | | | | | | | | | | | |
| | | | | | | | | | | | Shift Curves | |
| | | | | | | | | | | | Act Position (0-462) | |

FIG. 13 (cont.)

| Number | MPH | Wheel Speed (rad/s) | RPM | Ideal GR old | Ideal GR | GR | Revs | Test | Perf | Econ | Drag Race | Step |
|---|---|---|---|---|---|---|---|---|---|---|---|---|
| 86 | 17.2 | 4.20 | 1500 | 2.39 | 1.75 | 1.75 | 1.78 | 455 | 327 | 225 | 364 | 400 |
| 87 | 17.4 | 4.25 | 1500 | 2.42 | 1.77 | 1.77 | 1.79 | 458 | 327 | 225 | 367 | 400 |
| 88 | 17.6 | 4.30 | 1500 | 2.44 | 1.79 | 1.79 | 1.80 | 461 | 327 | 225 | 369 | 400 |
| 89 | 17.8 | 4.35 | 1500 | 2.47 | 1.81 | 1.80 | 1.81 | 462 | 327 | 225 | 372 | 400 |
| 90 | 18 | 4.40 | 1500 | 2.5 | 1.83 | 1.80 | 1.81 | 462 | 327 | 225 | 375 | 400 |
| 91 | 18.2 | 4.45 | 1500 | 2.53 | 1.85 | 1.80 | 1.81 | 462 | 327 | 225 | 378 | 400 |
| 92 | 18.4 | 4.50 | 1500 | 2.55 | 1.87 | 1.80 | 1.81 | 462 | 327 | 225 | 381 | 400 |
| 93 | 18.6 | 4.55 | 1500 | 2.58 | 1.89 | 1.80 | 1.81 | 462 | 327 | 225 | 383 | 400 |
| 94 | 18.8 | 4.60 | 1500 | 2.61 | 1.91 | 1.80 | 1.81 | 462 | 327 | 225 | 386 | 400 |
| 95 | 19 | 4.64 | 1500 | 2.64 | 1.93 | 1.80 | 1.81 | 462 | 327 | 225 | 389 | 400 |
| 96 | 19.2 | 4.69 | 1500 | 2.67 | 1.95 | 1.80 | 1.81 | 462 | 327 | 225 | 392 | 442 |
| 97 | 19.4 | 4.74 | 1500 | 2.69 | 1.97 | 1.80 | 1.81 | 462 | 327 | 225 | 395 | 442 |
| 98 | 19.6 | 4.79 | 1500 | 2.72 | 2.00 | 1.80 | 1.81 | 462 | 327 | 225 | 397 | 442 |
| 99 | 19.8 | 4.84 | 1500 | 2.75 | 2.02 | 1.80 | 1.81 | 462 | 327 | 225 | 400 | 442 |
| 100 | 20 | 4.89 | 1500 | 2.78 | 2.04 | 1.80 | 1.81 | 462 | 327 | 225 | 403 | 442 |
| 101 | 20.2 | 4.94 | 1500 | 2.8 | 2.06 | 1.80 | 1.81 | 462 | 327 | 225 | 406 | 442 |
| 102 | 20.4 | 4.99 | 1500 | 2.83 | 2.08 | 1.80 | 1.81 | 462 | 327 | 225 | 409 | 442 |
| 103 | 20.6 | 5.04 | 1500 | 2.86 | 2.10 | 1.80 | 1.81 | 462 | 327 | 225 | 411 | 442 |
| 104 | 20.8 | 5.08 | 1500 | 2.89 | 2.12 | 1.80 | 1.81 | 462 | 327 | 225 | 414 | 442 |
| 105 | 21 | 5.13 | 1500 | 2.92 | 2.14 | 1.80 | 1.81 | 462 | 327 | 225 | 417 | 442 |
| 106 | 21.2 | 5.18 | 1500 | 2.94 | 2.16 | 1.80 | 1.81 | 462 | 327 | 225 | 420 | 442 |
| 107 | 21.4 | 5.23 | 1500 | 2.97 | 2.18 | 1.80 | 1.81 | 462 | 327 | 225 | 423 | 442 |
| 108 | 21.6 | 5.28 | 1500 | 3 | 2.20 | 1.80 | 1.81 | 462 | 327 | 225 | 425 | 442 |
| 109 | 21.8 | 5.33 | 1500 | 3.03 | 2.22 | 1.80 | 1.81 | 462 | 327 | 225 | 428 | 442 |
| 110 | 22 | 5.38 | 1500 | 3.05 | 2.24 | 1.80 | 1.81 | 462 | 327 | 225 | 431 | 442 |
| 111 | 22.2 | 5.43 | 1500 | 3.08 | 2.26 | 1.80 | 1.81 | 462 | 327 | 225 | 434 | 442 |
| 112 | 22.4 | 5.48 | 1500 | 3.11 | 2.28 | 1.80 | 1.81 | 462 | 327 | 225 | 437 | 442 |
| 113 | 22.6 | 5.52 | 1500 | 3.14 | 2.30 | 1.80 | 1.81 | 462 | 327 | 225 | 439 | 442 |
| 114 | 22.8 | 5.57 | 1500 | 3.17 | 2.32 | 1.80 | 1.81 | 462 | 327 | 225 | 442 | 442 |
| 115 | 23 | 5.62 | 1500 | 3.19 | 2.34 | 1.80 | 1.81 | 462 | 327 | 225 | 442 | 442 |
| 116 | 23.2 | 5.67 | 1500 | 3.22 | 2.36 | 1.80 | 1.81 | 462 | 327 | 225 | 442 | 442 |
| 117 | 23.4 | 5.72 | 1500 | 3.25 | 2.38 | 1.80 | 1.81 | 462 | 327 | 225 | 442 | 442 |
| 118 | 23.6 | 5.77 | 1500 | 3.28 | 2.40 | 1.80 | 1.81 | 462 | 327 | 225 | 442 | 442 |
| 119 | 23.8 | 5.82 | 1500 | 3.3 | 2.42 | 1.80 | 1.81 | 462 | 327 | 225 | 442 | 442 |
| 120 | 24 | 5.87 | 1500 | 3.33 | 2.44 | 1.80 | 1.81 | 462 | 327 | 225 | 442 | 442 |
| 121 | 24.2 | 5.92 | 1500 | 3.36 | 2.46 | 1.80 | 1.81 | 462 | 327 | 225 | 442 | 442 |
| 122 | 24.4 | 5.96 | 1500 | 3.39 | 2.48 | 1.80 | 1.81 | 462 | 327 | 225 | 442 | 442 |
| 123 | 24.6 | 6.01 | 1500 | 3.41 | 2.50 | 1.80 | 1.81 | 462 | 327 | 225 | 442 | 442 |
| 124 | 24.8 | 6.06 | 1500 | 3.44 | 2.52 | 1.80 | 1.81 | 462 | 327 | 225 | 442 | 442 |
| 125 | 25 | 6.11 | 1500 | 3.47 | 2.54 | 1.80 | 1.81 | 462 | 327 | 225 | 442 | 442 |
| 126 | 25.2 | 6.16 | 1500 | 3.5 | 2.57 | 1.80 | 1.81 | 462 | 327 | 225 | 442 | 442 |
| 127 | 25.4 | 6.21 | 1500 | 3.53 | 2.59 | 1.80 | 1.81 | 462 | 327 | 225 | 442 | 442 |
| 128 | 25.6 | 6.26 | 1500 | 3.55 | 2.61 | 1.80 | 1.81 | 462 | 327 | 225 | 442 | 442 |

| Speed MPH | Desired Current A | Motor Speed RPM | Sprocket Ratio | CVT input speed mph |
|---|---|---|---|---|
| 0 | 45 | 2368 | 0.17 | 11.98 |
| 1 | 45 | 2368 | 0.17 | 11.98 |
| 2 | 40 | 2464 | 0.17 | 12.46 |
| 3 | 40 | 2464 | 0.17 | 12.46 |
| 4 | 38 | 2502 | 0.17 | 12.65 |
| 5 | 35 | 2560 | 0.17 | 12.95 |
| 6 | 32 | 2617 | 0.17 | 13.24 |
| 7 | 31 | 2636 | 0.17 | 13.33 |
| 8 | 30 | 2655 | 0.17 | 13.43 |
| 9 | 28 | 2694 | 0.17 | 13.62 |
| 10 | 25 | 2751 | 0.17 | 13.91 |
| 11 | 22 | 2809 | 0.17 | 14.21 |
| 12 | 18 | 2885 | 0.17 | 14.59 |
| 13 | 16 | 2924 | 0.17 | 14.79 |
| 14 | 14 | 2962 | 0.17 | 14.98 |
| 15 | 13 | 2981 | 0.17 | 15.08 |
| 16 | 10 | 3039 | 0.17 | 15.37 |
| 17 | 10 | 3039 | 0.17 | 15.37 |
| 18 | 10 | 3039 | 0.17 | 15.37 |

FIG. 19

SYSTEMS AND METHODS FOR CONTROL OF TRANSMISSION AND/OR PRIME MOVER

CROSS REFERENCE TO RELATED APPLICATIONS

This application is a continuation of U.S. application Ser. No. 13/054,767, filed Apr. 13, 2011 and scheduled to issue on Aug. 26, 2014 as U.S. Pat. No. 8,818,661, which is a national phase application of International Application No. PCT/US2009/052761, filed Aug. 4, 2009, which claims the benefit of U.S. Provisional Patent Application No. 61/086,366, filed Aug. 5, 2008. The disclosures of all of the above-referenced prior applications, publications, and patents are considered part of the disclosure of this application, and are incorporated by reference herein in their entirety.

FIELD OF THE INVENTION

The present invention relates generally to mechanical power transmission, and more specifically to systems for and methods of control of continuously variable transmissions and electric drive motors.

RELATED TECHNOLOGY

Electric vehicles are becoming more popular around the world as battery prices decline and technology and performance advance. Factors such as high fuel costs and internal combustion engine emissions are making electric vehicles more attractive to customers looking for a cost-effective commuting option. However, the performance and range of a typical electric vehicle is often inferior when compared to that of competitive gasoline-powered vehicles. Additionally, manufacturer stated maximum speed and range values are often based on idealized duty cycles that are not representative of real-world conditions.

There is a need for technology that can increase performance and range of electric vehicles to make them competitive with gasoline-powered vehicles; hence, providing quiet, clean, and efficient transportation for commuters worldwide. By way of example, as described herein below in relation to inventive embodiments, integrating a continuously variable drivetrain (for example, employing a continuously variable transmission and suitable control strategies) in electric vehicles yields numerous advantages.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a method of controlling a prime mover and a continuously variable transmission (CVT). The CVT has a group of spherical power adjusters. Each power adjuster has a tiltable axis of rotation. In one embodiment, the method includes the steps of disabling operation of the prime mover. The method has the step of performing an auto-zero routine on the CVT. The method includes the step of evaluating a throttle signal indicative of a command to the prime mover. The method also includes the step of activating the prime mover to enable operation of the prime mover.

Another aspect of the invention concerns a method of controlling a continuously variable transmission (CVT) that has a group of spherical power adjusters. Each power adjuster has a tiltable axis of rotation. In one embodiment, the method includes the step of receiving a shift mode input from a user. The method can also include the step of performing a shifter process based at least in part on at least the shift mode input and at least one variable from a lookup table having prescribed output values of ratio of the CVT. The method includes the step of performing an actuator process based at least in part on the shifter process. In one embodiment, the actuator process is in communication with an actuator of the CVT. The method also includes the step of adjusting the tiltable axes of the CVT based at least in part on the actuator process.

Yet another aspect of the invention concerns a control system for a drive system having a drive motor and a continuously variable transmission (CVT). The CVT has a group of spherical power adjusters. Each power adjuster has a tiltable axis of rotation. In one embodiment, the control system has an actuator configured to operably couple to the CVT to thereby adjust a ratio of the CVT. The control system includes a microcomputer in communication with the actuator. The microcomputer is in communication with the drive motor. The microcomputer is programmed to perform a shifter process. In one embodiment, the shifter process receives a shift mode input from a user of the CVT.

One aspect of the invention relates to a method of optimizing a vehicle having a drive motor and a continuously variable transmission (CVT). The CVT has a group of spherical power adjusters. Each power adjuster has a tiltable axis of rotation. In one embodiment, the method includes the steps of receiving a desired vehicle speed and receiving a desired motor current draw. The method includes the step of determining a motor speed based at least in part on the desired motor current draw. The method has the step of receiving a sprocket ratio of the vehicle. The sprocket ratio corresponds to a coupling between the CVT and the drive motor. The method also includes the step of determining an input speed to the CVT based at least in part on the motor speed and the sprocket ratio to achieve the desired vehicle speed.

Another aspect of the invention concerns a method of optimizing a drive system having a drive motor and a continuously variable transmission (CVT). The CVT has a group of spherical power adjusters. Each power adjuster has a tiltable axis of rotation. In one embodiment, the method includes the step of receiving a first variable indicative of a desired speed of the drive system. The method includes receiving a second variable indicative of a desired current draw of the drive motor. The method has the step of determining a drive motor speed based at least in part on the desired current draw. In one embodiment, the method includes the step of receiving a third variable indicative of a gear ratio of the drive system. The method includes determining an input speed of the CVT based at least in part on the drive motor speed. The method has the step of determining a desired CVT ratio based at least in part on the input speed of the CVT and the desired vehicle speed. The method also includes the step of determining a shift actuator position based at least in part on the desired CVT ratio.

Yet another aspect of the invention relates to a method of optimizing a drive system having a prime mover and a continuously variable transmission (CVT). The CVT has a group of spherical power adjusters. Each power adjuster has a tillable axis of rotation. In one embodiment, the method includes the step of selecting a desired range of current of the prime mover. The method includes the step of selecting a predetermined speed of a vehicle equipped with the drive system. The method has the step of applying a load to the CVT and the prime mover and operating the CVT and the prime mover at the predetermined speed. In one embodiment, the method includes the step of monitoring the current draw of the prime mover. The method includes the step of comparing the current draw to the desired range of current. The method also includes the step of adjusting a ratio of the CVT based at least in part on the comparison.

BRIEF DESCRIPTION OF THE DRAWINGS

FIG. 13 is a data table having data associated with the chart of FIG. 12.

FIG. 19 is a table of exemplary data of a map of predetermined vehicle speed and current draw, the map related to motor speed and CVP input speed.

DETAILED DESCRIPTION OF CERTAIN INVENTIVE EMBODIMENTS

Figure 1:
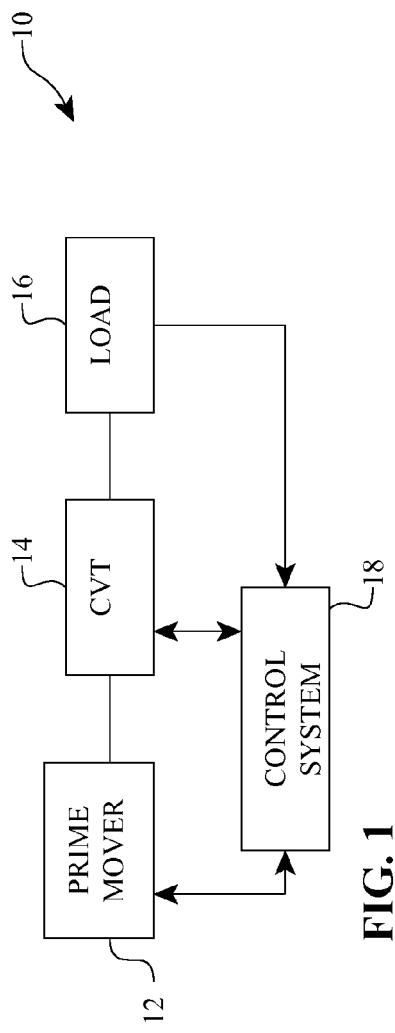
FIG. 1 is a block diagram of a drive system that can implement the control systems and methods disclosed here.

The preferred embodiments will now be described with reference to the accompanying figures, wherein like numerals refer to like elements throughout. Inventive embodiments may include several novel features, no single one of which is solely responsible for its desirable attributes or which is essential to practicing the inventions herein described. The CVT/IVT embodiments described here are generally related to transmissions and variators disclosed in U.S. Pat. Nos. 6,241,636; 6,419,608; 6,689,012; 7,011,600; U.S. patent application Ser. Nos. 11/243,484, 11/543,311, 60/887,767; 60/895,713; 60/914,633; and Patent Cooperation Treaty Patent Application PCT/US2008/052685. The entire disclosure of each of said patents and patent applications is hereby incorporated herein by reference.

A typical powertrain of an electric vehicle (EV) includes a power source (for example, a battery), an electric drive (for example, a drive motor and a drive motor controller), and a fixed-gear transmission device (for example, sprockets, chain, gearing, etc.). Usually an EV uses a direct-drive configuration where the operating speed of the EV is linked directly to the speed of the electric drive motor by a fixed gear ratio (or, in other words, a fixed transmission speed ratio). This is a simple configuration, and no variable transmission speed ratios are implemented, usually at the expense of efficiency and/or performance (for example, limiting acceleration and maximum speed of the EV).

However, an EV system can be improved by incorporating a continuously variable transmission (CVT) into the EV drivetrain. When a CVT is used in an EV, vehicle performance can be improved because the drivetrain can be optimized at particular operational speeds and load conditions. A CVT also improves the efficiency of an EV. The efficiency of the electric motor is a function of operating speed and load, and battery and/or vehicle range is a function of current draw. A CVT and a suitable controller allow the drivetrain to operate at speeds of the drive motor, and with selected drive motor current management, such that overall efficiency and range can be improved. In one embodiment, the CVT is a NuVinci® CVT, which is a compact, high torque-density unit that uses a planetary configuration based on spheres and traction to provide continuously variable speed ratio control. A NuVinci® CVT can provide a continuously variable speed ratio by tilting a rotating axis of each of the spheres. In some embodiments, a NuVinci® CVT is provided with a shift rod to facilitate the tilting of the rotating axes. Exemplary embodiments of NuVinci-type CVTs are described generally in U.S. patent application Ser. No. 11/543,311.

By way of example, a NuVinci® CVT and a suitable control system (such as those inventive embodiments described herein) can provide smooth, seamless shifts of the transmission speed ratio across the full range of speed ratios. In addition, since there are no fixed gear ratios, the control system is able to control component speeds precisely, allowing them to operate substantially at their optimal speed for a given operating condition. In some embodiments, the control logic also allows programming for different conditions, allowing the user (or manufacturer) to decide when performance or range is ultimately desired. Certain configurations of the NuVinci® CVT are easily packaged on an EV, and do not significantly affect the cost or the weight of the EV.

Additionally, users demand different operating characteristics from EVs. Some users are concerned with maximum range, while other users care more about performance factors (for example, vehicle launch, maximum speed, and hill climbing at speed). In the case of an inexperienced user, desiring maximum efficiency and range, the user might operate the EV in a fashion that provides better performance (for example, a quicker launch and/or higher maximum speed of the EV), but ultimately causes the maximum range to suffer dramatically because of high current draw and operation of the electric drive motor at an inefficient speed. However, when combined with a suitable control system for optimal drivetrain operation, a CVT can allow the EV to operate in a desired mode, such as a performance mode or an efficiency mode. In performance mode, range and efficiency are less important than outright performance, and the transmission control system optimizes for acceleration, maximum speed of the EV, and hill climbing at speed, for example. In economy mode, range is the priority, so the control system keeps the drive motor at its most efficient speed and imposes limits on current draw from the battery, for example.

In one embodiment, a control strategy uses data for motor efficiency versus motor speed and motor torque, as well as battery life versus current draw, to improve performance and efficiency of the overall system. Analysis models, such as those inventive embodiments described herein, indicate that there are benefits of using a CVT in EVs, and the results of the analysis have been confirmed by empirical testing of CVT-equipped EVs that were compared to benchmark stock vehicles having fixed-gear ratios.

The typical duty cycle of an EV is highly dynamic because it involves numerous stops and starts, uneven terrain, and variable wind resistance. A drivetrain with a CVT can benefit an EV that operates over these dynamic speed and load conditions by allowing the drive motor to operate closer to its peak power or peak efficiency over a broad range of a given duty cycle. Generally, when coupled to a CVT a propulsion source is capable of generating more torque and more speed than when coupled with a fixed gear ratio transmission. As compared to a fixed-gear ratio configuration, a CVT lower gear ratio can allow for better launch feel and better hill climb ability, while a CVT higher gear ratio can allow for higher maximum speeds. Additionally, in certain circumstances, increased acceleration of the EV is possible because the CVT changes the effective inertia seen at the drive motor.

Referencing FIG. 1 now, a drive system 10 includes a prime mover 12 coupled to a continuously variable transmission (CVT) 14, which is coupled to a load 16. In one embodiment, a control system 18 is adapted to receive information from the prime mover 12, CVT 14, and/or load 16. The control system 18 can also be adapted to provide commands to, or actuate, the prime mover 12 and the CVT 14 together or independently. The prime mover 12 can be any source of power, such as an electric motor, internal combustion engine, wind turbine, a combination thereof, etc. The electric motor can be, for example, a brushed DC motor, a brushless DC motor, a permanent magnet motor, or any other type of electric motor. The load 16 can be a tractive load, which can include the weight of vehicle and/or an operator and/or cargo and passengers. The CVT can be a ball planetary CVT, a toroidal CVT, or a belt-and-pulley CVT, for example. In one embodiment, a drive system 10 includes a NuVinci® continuously variable planetary, and a drive mechanism between the prime mover and the CVT. The drive mechanism can be, for example, a chain and sprocket drive, a direct gear drive, or any other type of power transmission gearing. In some embodiments, the control system 18 includes sensors, actuators, and control hardware, firmware, and logic as described further below.

The system, or subassemblies thereof, shown in FIG. 1 can be adapted for use in any ground, air, or water transportation machine, industrial or agricultural equipment, aerospace vehicles and equipment, and household machines, to name a few applications.

Figure 2:
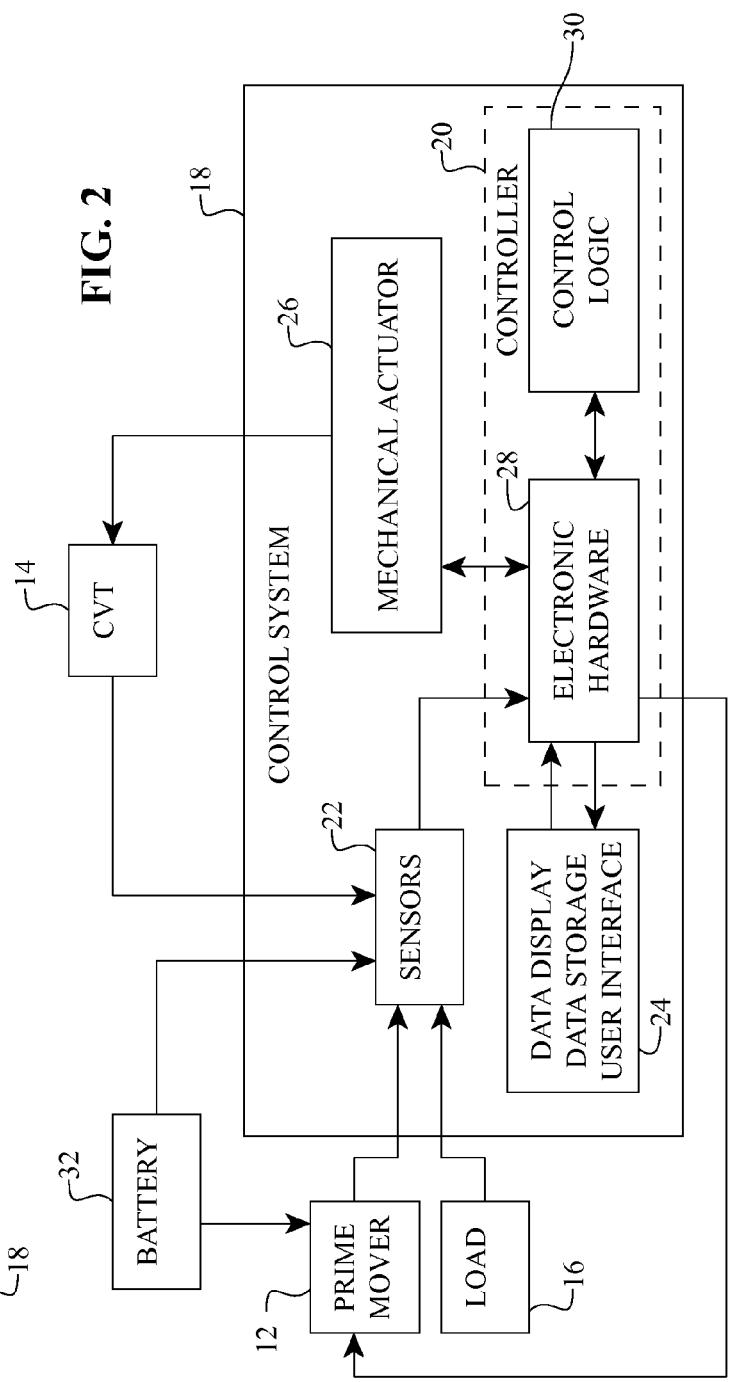
FIG. 2 is a block diagram of one embodiment of a control system that can be used with the drive system of FIG. 1.

FIG. 2 illustrates one embodiment of a control system 18 that includes a controller 20 in communication with sensors 22, a data display and user interface 24, a mechanical actuator 26, and the prime mover 12. In one embodiment, the controller 20 includes electronic hardware 28 in communication with control logic 30. In some embodiments, the sensors 22 are adapted to sense conditions of the prime mover 12, load 16, and a battery 32, which can be configured to provide power to the prime mover 12. The battery 32 can be, for example, a 36V battery.

Figure 3:
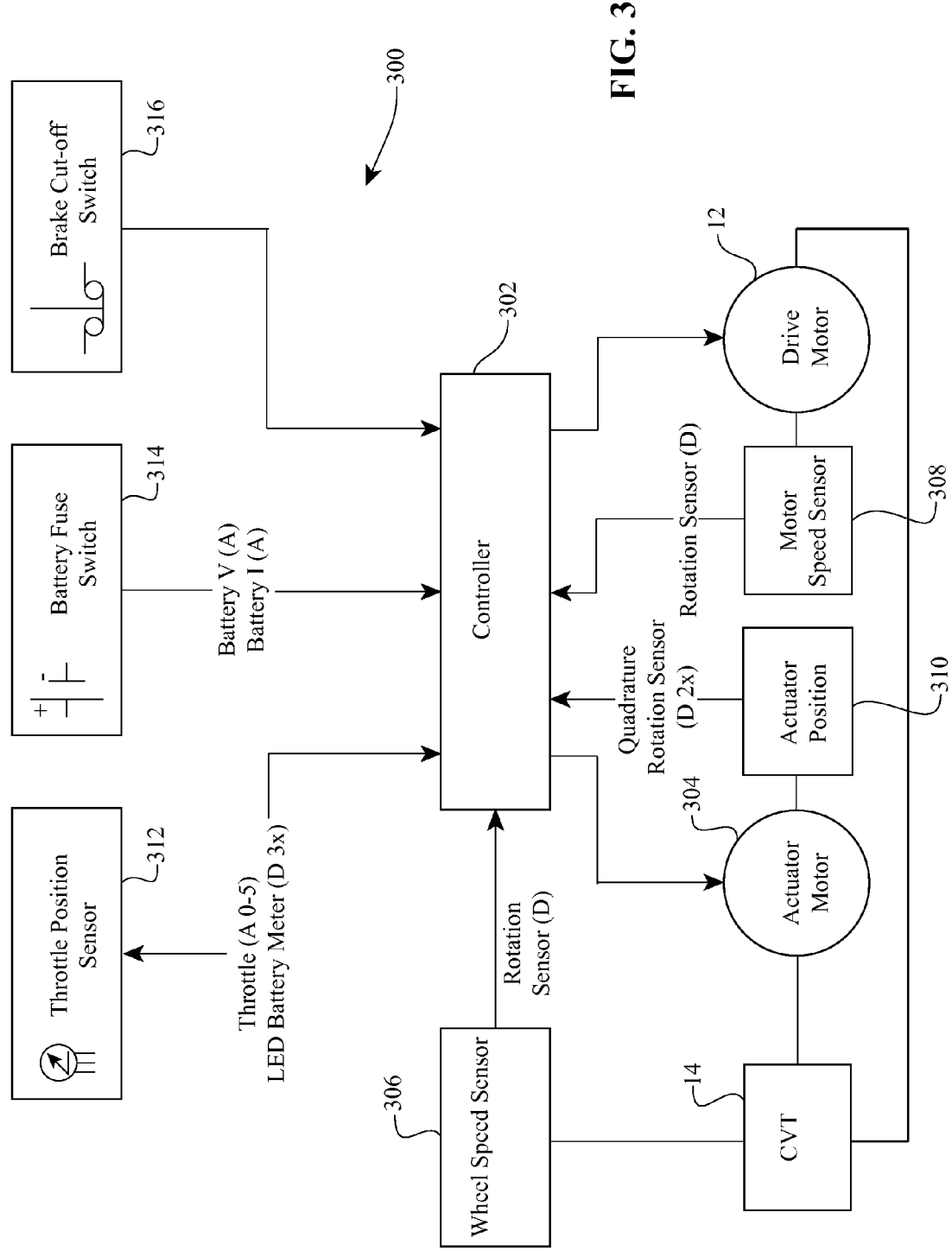
FIG. 3 is a block diagram of a drive control system having an integrated controller.

Referencing FIG. 3 now, in one embodiment a control system 300 can include a controller 302 configured to control the CVT 14 and the prime mover 12 to maximize the performance and efficiency of a vehicle. This embodiment can be referred to as an integrated control in that most or all of the control components and functionality used to control the CVT 14 and the prime mover 12 can be integrated in a single controller 302, which in some embodiments include a single electronic board. In one embodiment, the controller 302 can be adapted to receive a throttle input (which can be a voltage source).

In one embodiment, the control system 300 can include an actuator motor 304 to actuate a shift (that is, an adjustment) of the speed ratio of the CVT 14. The CVT 14 can be coupled to the drive wheel assembly of a vehicle, for example. In one embodiment, the system includes sensors. These can include a wheel speed sensor 306 for sensing wheel speed and/or a motor speed sensor 308 for sensing the speed of a drive motor. The sensors 306, 308 can be any type of speed sensor, for example an active magnetic sensor, passive magnetic sensor, or encoder of any type. In some embodiments, the speed of the drive motor can be sensed directly in the controller 302 by measuring the frequency of electric current supplied to the drive motor 12. Similarly, there can be an actuator position sensor 310 that can be, for example, an encoder or a potentiometer. In some embodiments, the actuator position can be derived from the measured speed ratio of the CVT 14. The speed ratio of the CVT 14 can be calculated from the wheel speed, speed of the drive motor, and any gear ratios in the system. The system 300 can additionally include a throttle position sensor 312, a battery fuse switch and/or sensor 314, and a brake cut-off switch and/or sensor 316, any of which can be configured to provide signals to the controller 302.

Figures 4, 5:
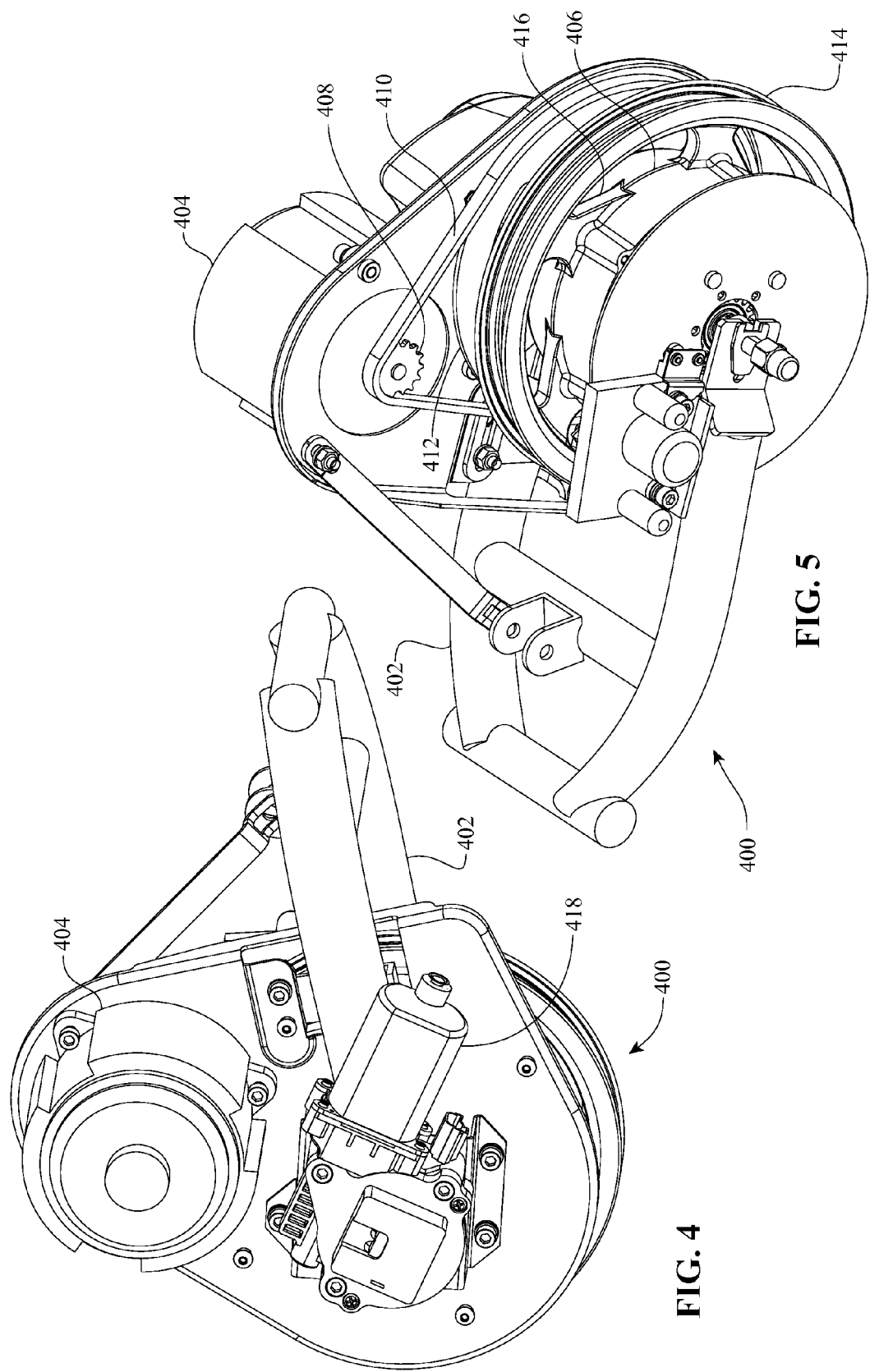
FIG. 4 is a perspective view of a drive system as implemented in a vehicle.
FIG. 5 is a second perspective view of the drive system of FIG. 4.

Passing now to FIGS. 4 and 5, in one embodiment a drive system 400 can include a frame 402 of a vehicle (a scooter, electric bicycle, or motorcycle, for example) configured to support a drive motor 404 that is coupled to a CVT 406 via a pinion 408, a chain 410, and a sprocket 412. In some embodiments, the CVT 406 is integrated in the rear wheel hub of the vehicle and can be configured to transfer a drive torque or power to a rim 414 via a number of radially extending spokes 416. A shift actuator 418 can be coupled to the CVT 406. The shift actuator 418 can include a shift actuator motor (for example, shift actuator motor 304) and suitable gearing (such as reduction gears, for example).

Figure 6:
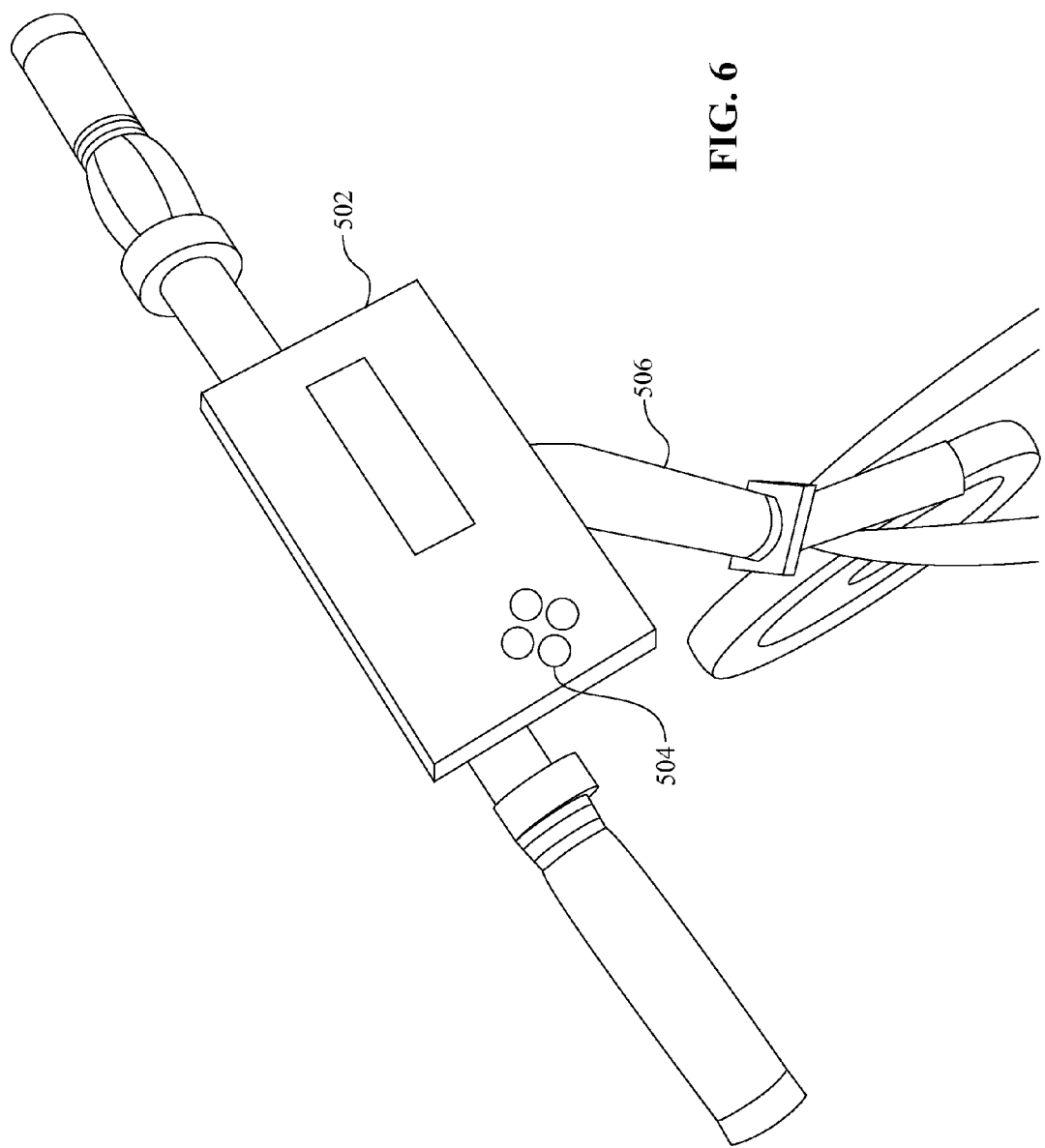
FIG. 6 is a perspective view of one embodiment of a user interface device that can be used with the control system of FIG. 2.

Referencing FIGS. 1 and 6 now, in one embodiment, the control system 18 includes a user interface device 502. The interface device 502 can display at least some of the operating parameters of the system 10, for example, battery voltage, speed of the prime mover 12, speed of the vehicle 506, throttle position, speed ratio of the CVT 14, or mileage. Mileage can be displayed in terms of Watt-hrs/mile or some other units. The interface device 502 can be equipped with input buttons 504 to allow selection of different modes of operation while stopped or driving. The interface device 502 can be integral with the vehicle 506. Alternatively, the interface device 502 can be removable, with attachment hardware that allows easy removal of the interface device 502. The interface device 502 can be configured to record data of any signal generated or derived from the controller 302. Data can be recorded at periodic frequency, for example, a reading of all measured or derived signals every 50 ms. In some embodiments, the input buttons 504 can be remotely mounted from the display. In other embodiments, the input buttons 504 can be mounted on a handgrip of the vehicle 506.

Figure 7A:
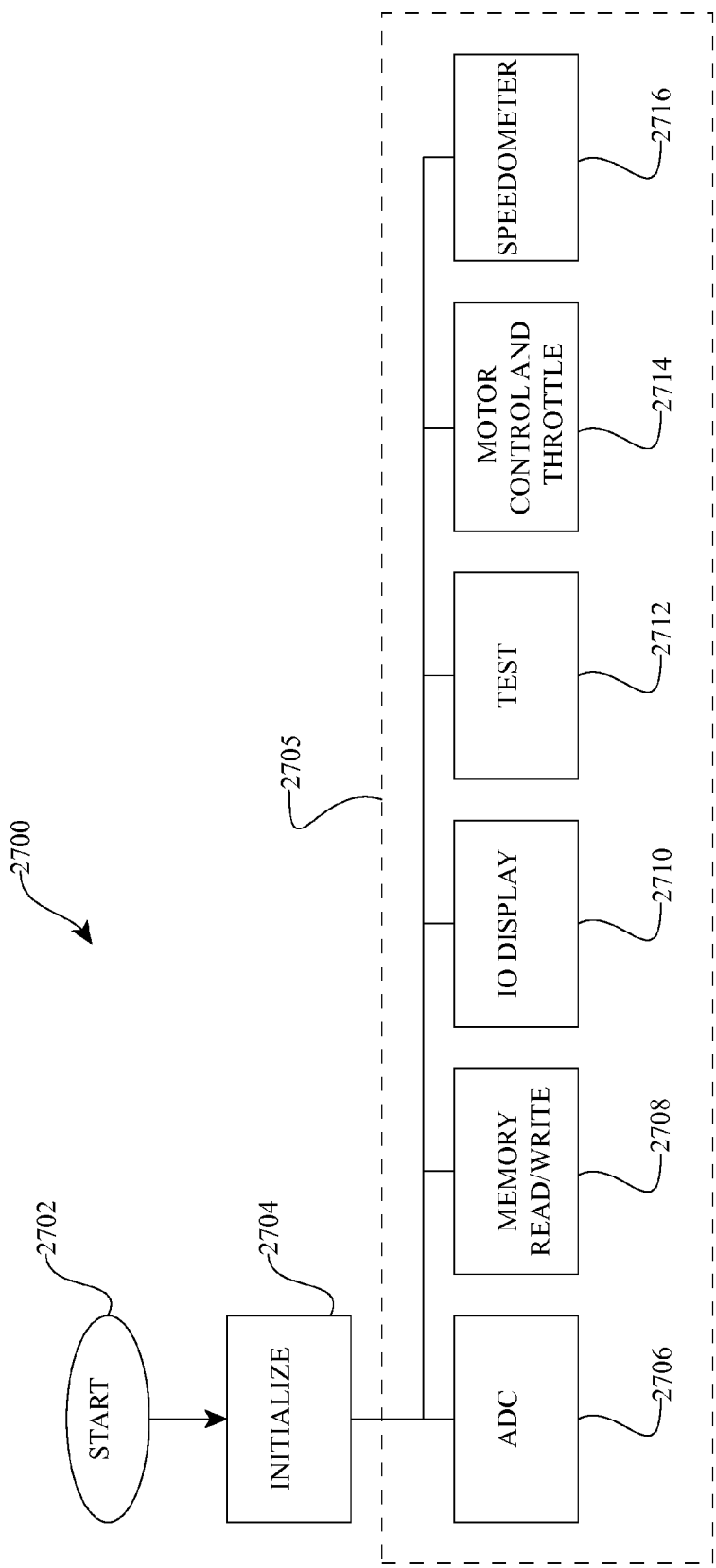
FIG. 7A is a flowchart describing one embodiment of a control process that can be used with the drive system of FIG. 1.

Turning to FIG. 7A now, an exemplary process 2700 of controlling a prime mover 12 and/or a CVT 14 is illustrated. The process 2700 starts at a state 2702. The process 2700 moves to an initialization state 2704, wherein an initialization routine runs a number of processes further described below. In one embodiment, the process 2700 performs various subprocesses within a main control loop 2705 upon completion of the initialization state 2704. The subprocesses within the main control loop 2705 include an analog-to-digital converter subprocess 2706, a memory read/write subprocess 2708, a display 10 subprocess 2710, a test subprocess 2712, a motor control and throttle subprocess 2714, and a road speed calculation subprocess 2716.

Figure 7B:
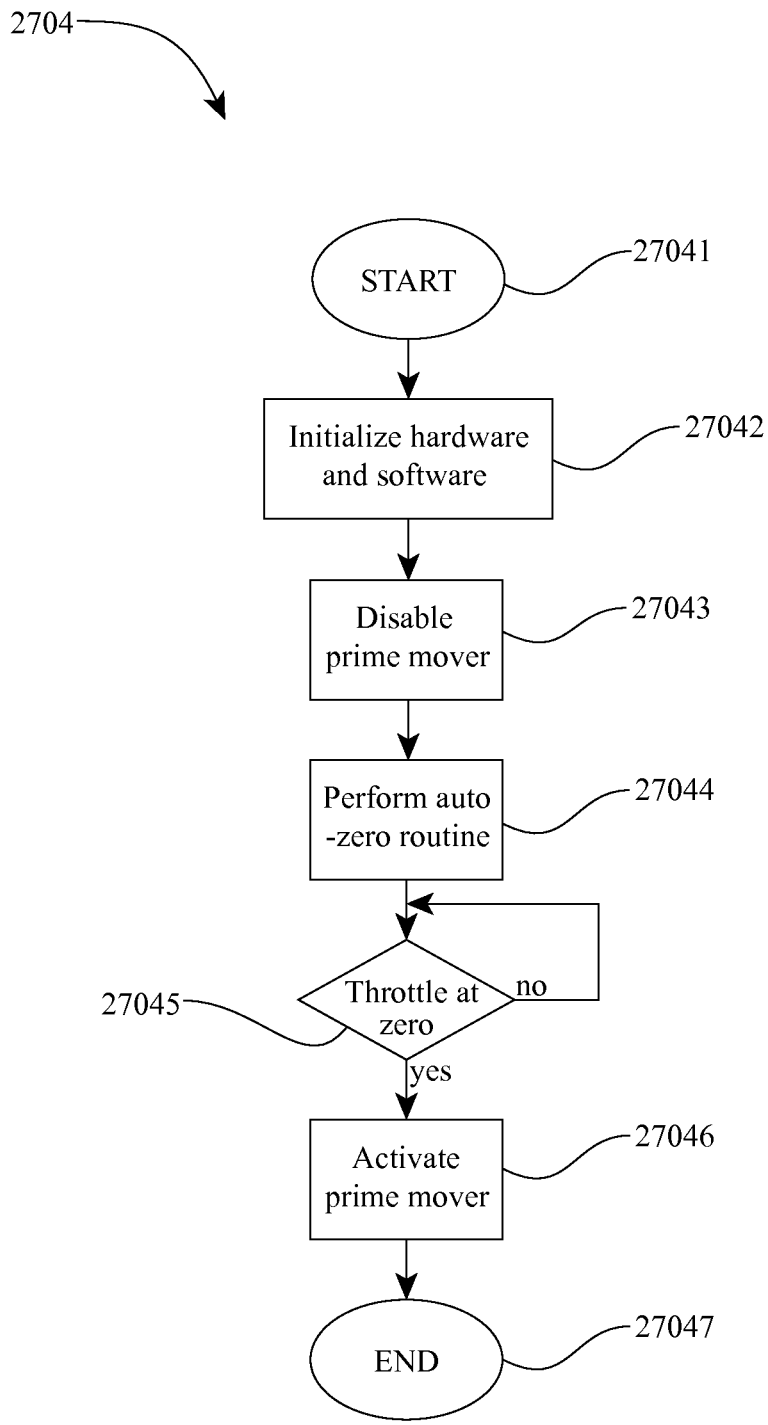
FIG. 7B is a flowchart of an initialization routine that can be performed in the control process of FIG. 7A.

Referring to FIG. 7B, in one embodiment, the initialization state 2704 can be a process that begins at state 27041 and proceeds to a subprocess 27042, wherein the initialization of hardware and/or software is performed in preparation for operating the drive system 10, for example. The initialization state 2704 then proceeds to a subprocess 27043 where the prime mover (for example, the drive motor 404) is disabled. The initialization state 2704 proceeds to a state 27044 where an auto-zero routine is performed. The auto-zero routine can adjust the CVT 14 to a desired configuration. For example, the tilt angle of the spheres, or power adjusters, of a NuVinci® CVT can be adjusted to an underdrive configuration to begin a drive cycle. In one embodiment, the CVT 14 is adjusted towards underdrive, while reading the position of the shift actuator 418, for example. When the reading stops changing (for example, when the shift actuator 418 has rotated until an internal shifter assembly of the CVT 14 runs up against a stop), the shift actuator 418 stops. In one embodiment, an actuator control process 3104 (see FIG. 11) can be used to control the shift actuator 418 and read the initial shift position parameter to complete the auto-zero routine. In one embodiment, the initialization state 2704 proceeds to a decision state 27045. At the decision state 27045 the throttle signal is evaluated, for example from the throttle position sensor 312 (FIG. 3). In some embodiments, upon completion of subprocess 27044 the prime mover can become active once the throttle signal is at a zero level threshold, which can prevent unexpected or runaway conditions of the vehicle. The initialization state 2704 proceeds to a subprocess 27046 to activate the prime mover, for example, the drive motor 12. At a state 27047, the initialization state 2704 ends and the process 2700 can proceed to enter the main control loop 2705.

Figure 8:
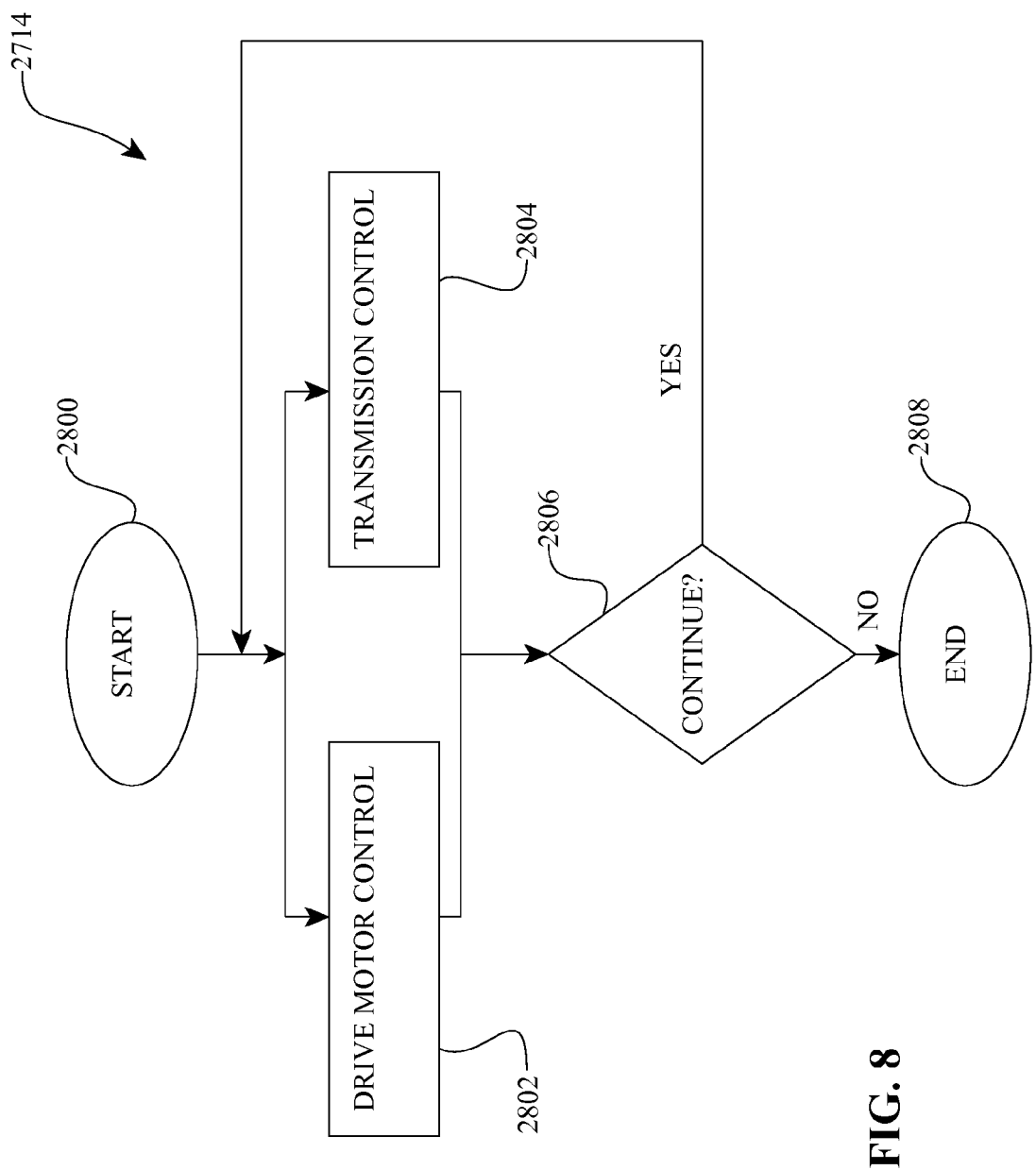
FIG. 8 is a flowchart of a transmission and/or prime mover control subprocess that can be used with the process of FIG. 7A.

Referencing FIG. 8 now, in one embodiment the motor control and throttle subprocess 2714 can be configured as a loop that repeats every 5-milliseconds 200 Hz refresh), for example. In one embodiment, the motor control and throttle subprocess 2714 includes a drive motor control module 2802 and a transmission control module 2804. The drive motor control module 2802, in some embodiments, can be any suitable pulse width modulation motor control scheme. In one embodiment, the transmission control module 2804 includes a position control servo feedback loop. Hence, the motor control and throttle subprocess 2714 can provide drive motor control and shift actuator position control.

In some embodiments, the motor control and throttle subprocess 2714 starts at a state 2800. The process 2714 then substantially simultaneously executes the drive motor control module 2808 and the transmission control module 2804. At a decision state 2806, the subprocess 2714 determines whether the subprocess 2714 should continue to be executed in its loop. If the decision is to continue, the subprocess 2714 resumes execution of the modules 2802, 2804. If the decision is not to continue, the subprocess ends at a state 2808. In some instances, at the decision state 2806 it is determined not to continue the subprocess 2714 because, for example, an off signal or a brake signal has been issued by the system.

Figure 9:
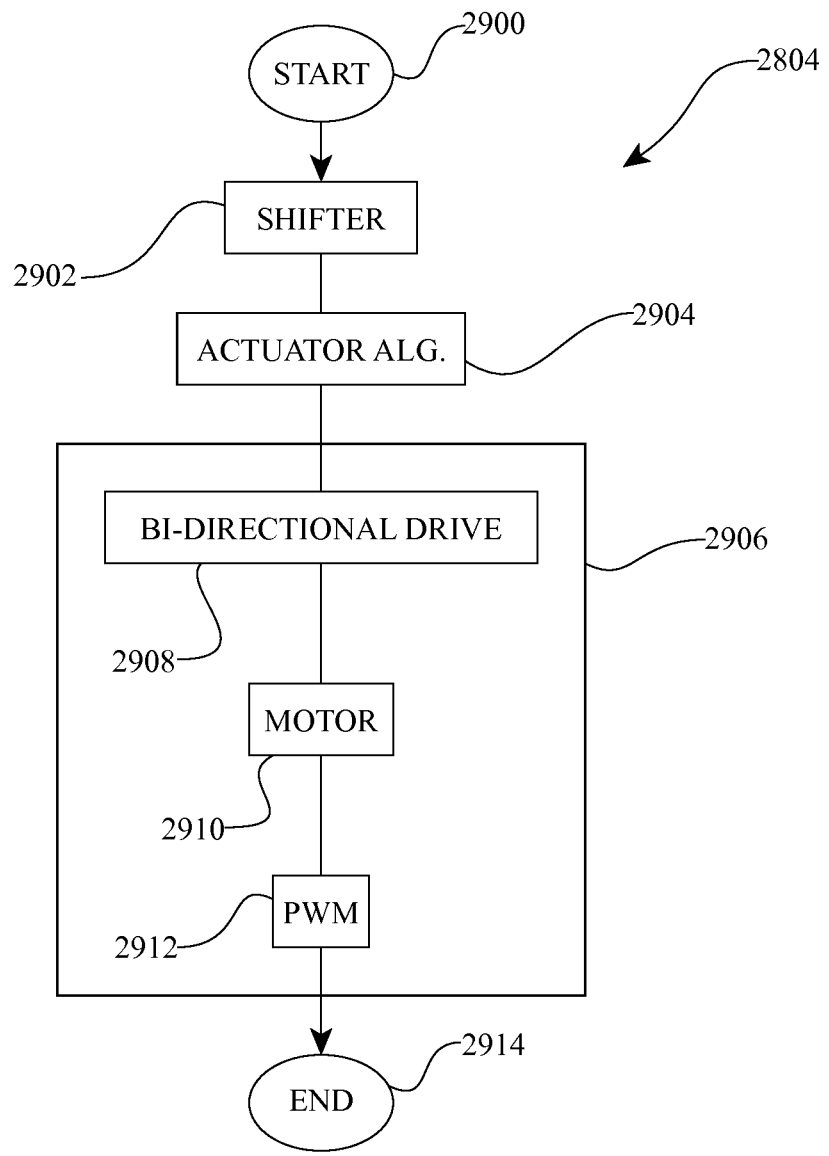
FIG. 9 is a flowchart of a transmission control subprocess that can be used with the subprocess of FIG. 8.
Figure 10:
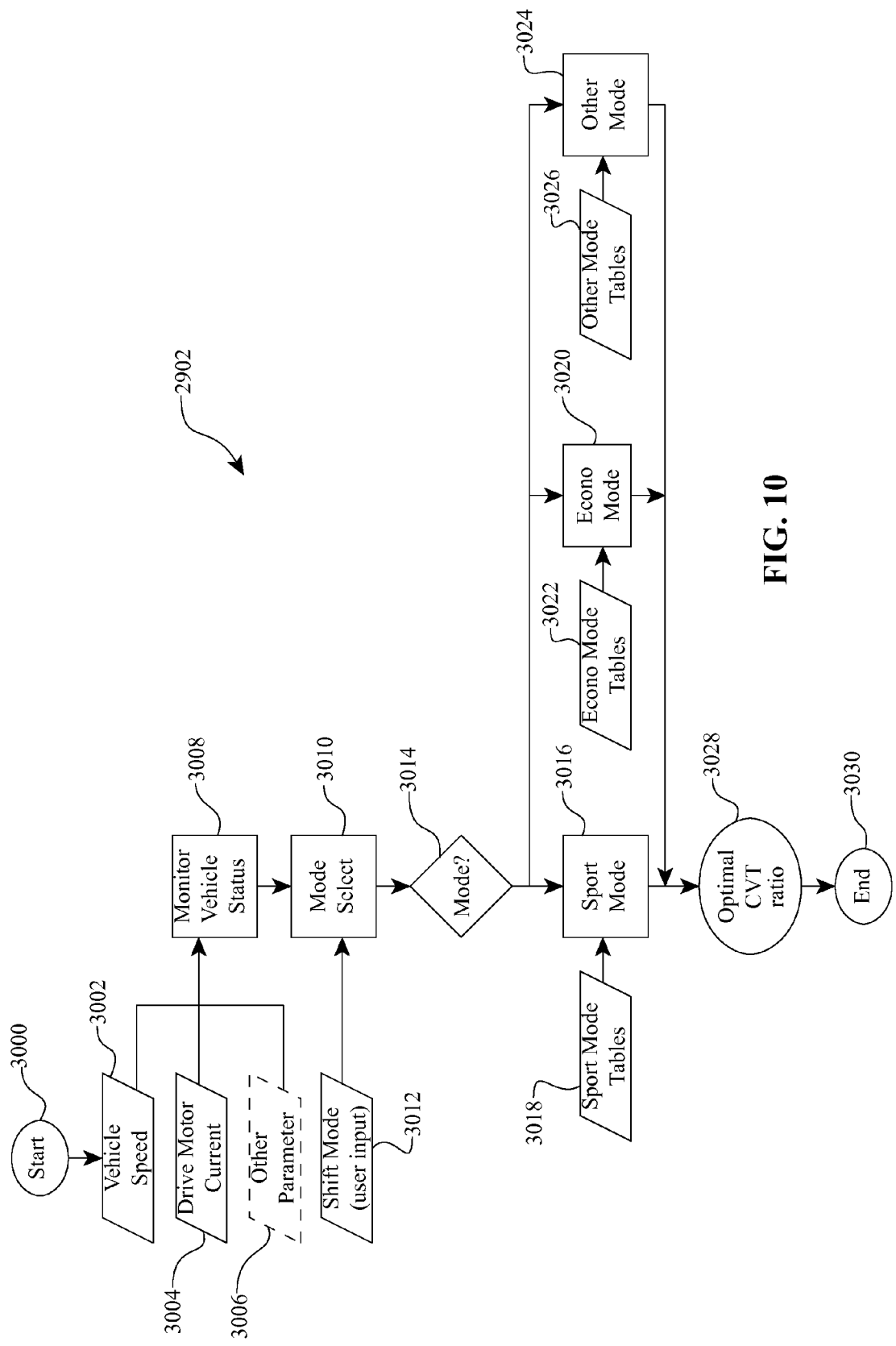
FIG. 10 is a flowchart of a subprocess for determining a speed ratio of a CVT, which subprocess can be used with the transmission control subprocess of FIG. 9.
Figure 11:
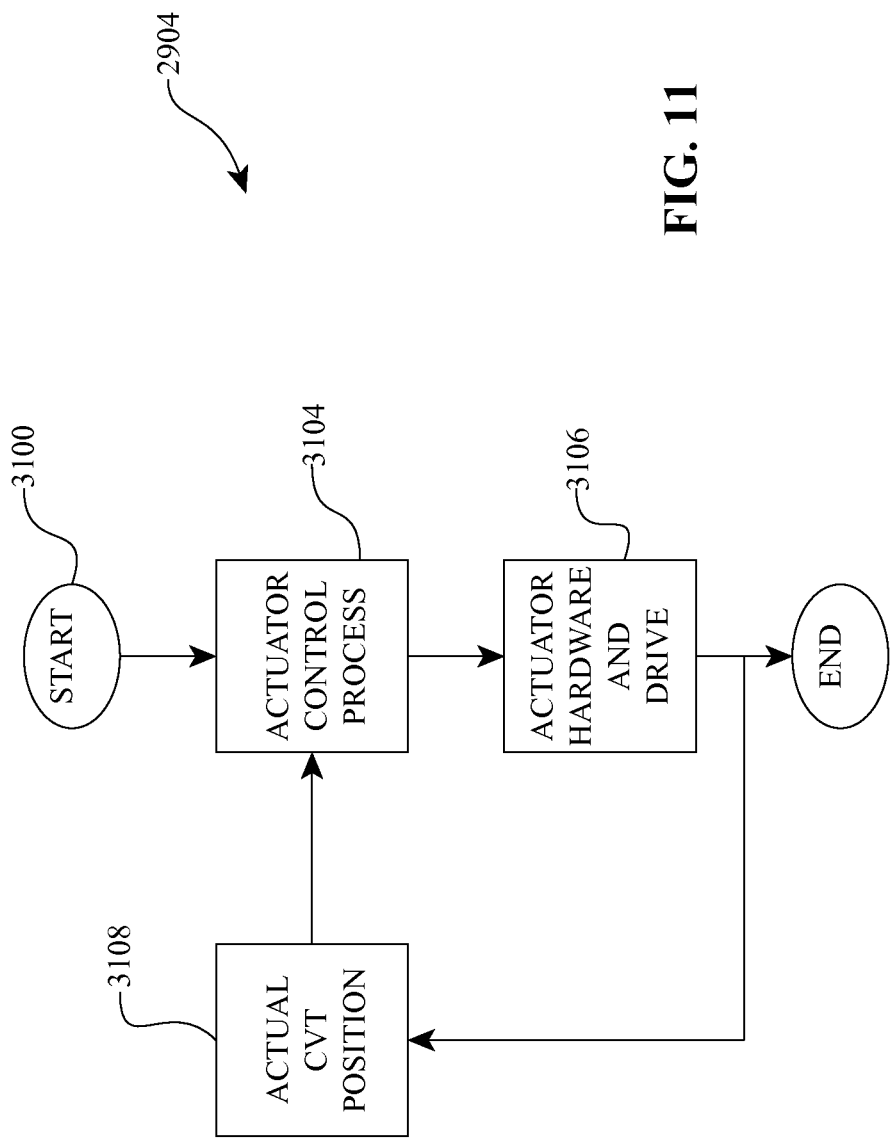
FIG. 11 is a flowchart of a subprocess for controlling a shift actuator of a CVT, which subprocess can be used with the transmission control subprocess of FIG. 9.

Referring to FIGS. 9-11, in some embodiments, the transmission control process 2804, which begins at a starting state 2900, determines a required CVT ratio (for example, the tilt angle of the spheres of a NuVinci® CVT) from a shifter process 2902 that handles the current state of inputs and from a lookup table with prescribed output values of ratio of the CVT 406. The transmission control process 2804 then passes the output set point to an actuator process 2904, which applies power, via an actuator motor drive module 2906, to the shift actuator 418 until the set point is reached.

In one embodiment, the transmission control process 2804 receives a set of inputs to describe a state of the vehicle. In some instances, these inputs include vehicle speed, drive motor current, and other parameters that describe the state of the vehicle. In some embodiments, the mode of the controller is also determined. The mode can be selected manually via a toggle switch or a button. In some embodiments, the mode can be a performance (sport) mode or an economy mode. Yet in other embodiments, the mode can be a simulated 4-speed transmission "sawtooth" mode. The controller can store mode tables in a memory. A mode table is a set of data that includes input parameters (for example, vehicle speed, motor current, etc.) as well as a desirable ratio of the CVT 406 as the output parameter. Input values can be used to reference a table and produce an output value. The output value is then passed over to the actuator process 2904.

The actuator process 2904 can be a proportional control feedback loop using the set point for the ratio of the CVT 406 as an input, with the actuator shaft encoder as a feedback signal. The actuator motor drive module 2906 can include a bi-directional (reversing) routine 2908, a motor drive routine 2910, and a suitable pulse width modulation (PWM) routine 2912. The transmission control process 2804 then ends at a state 2914.

FIG. 10 depicts one embodiment of a shifter process 2902. The shifter process 2902 starts at state 3000. Vehicle speed 3002, drive motor current 3004, and/or other parameters 3006 are received in a monitor vehicle status module 3008. The shifter process 2902 then moves to a mode select state 3010, wherein a shift mode input 3012 can be received. The shifter process 2902, then proceeds to a decision state 3014, wherein the shifter process 2902 determines which shift mode to use. If the shift mode selected is the sport mode, at a state 3016 the shifter process 2902 takes as input the sport mode lookup tables 3018. If the shift mode selected is the economy mode, at a state 3020 the shifter process 2902 takes as input the economy mode lookup tables 3022. If the shift mode selected is another mode, at a state 3024 the shifter process 2902 takes as input the appropriate lookup tables 3026 for the selected mode. In one embodiment, the shift mode input 3012 can be based at least in part on a signal received from a user interface (not shown) having a twist grip actuated by a user's hand. In some embodiments, the shift mode input 3012 can be based at least in part on a signal received from the user interface device 502, for example.

Based on the vehicle status and the mode selected, the shifter process 2902 determines an optimal ratio for the CVT 406 at a state 3028. In one embodiment, determining the optimal speed ratio for the CVT 406 includes determining a position for a shift rod of the CVT 406. In some embodiments, determining the optimum speed ratio for the CVT 406 includes determining a number of encoder counts for actuating a shifter mechanism of the CVT 406, which shifter mechanism can be a shift rod operably coupled to, for example, the shift actuator 418. The position of the shift actuator 418 can correspond to a ratio of the CVT 406, which is described below in reference to FIG. 15.

Referencing FIG. 11 now, an embodiment of the actuator process 2904 can start at a state 3100 and proceed to execute an actuator control process 3104. The actuator process 2904 then executes an actuator hardware and drive module 3106. The actuator process 2904 can then end, if an actual CVT position 3108 is substantially the same as the optimum CVT position determined by the shifter process 2902.

Figure 12:
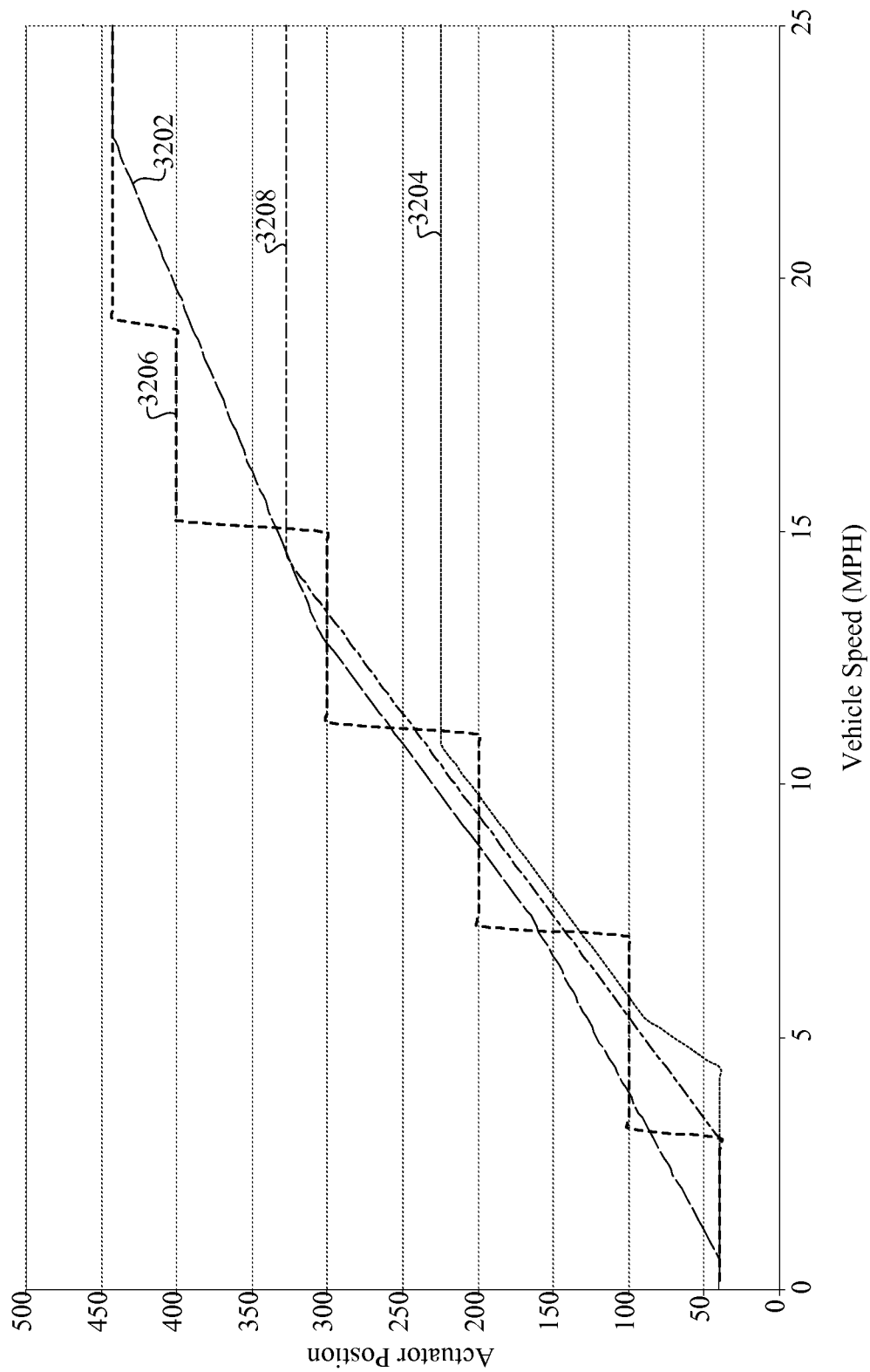
FIG. 12 is a chart of actuator position versus vehicle speed that can be used with the subprocess of FIG. 10 for determining a speed ratio of a CVT.

Passing to FIG. 12 now, a lookup table that can be used by the shifter process 2902 can be exemplified by each of the curves graphed on the chart shown. Depending on the speed of the vehicle, a speed ratio of the CVT 406 is selected (which is similar to selecting a position of a shifting mechanism of the CVT 406, such as a position of a shift rod; the position can be expressed in terms of encoder counts). A curve 3202 represents a lookup table for a "drag race" or fast acceleration mode. A curve 3204 represents a lookup table for an economy ("econ") mode. A curve 3206 represents a lookup table for a fixed ratio simulation (or "stepped") mode. A curve 3208 represent a lookup table for a performance (or "hill climb") mode. FIG. 13 is a data table used to derive the chart of FIG. 12. "MPH" refers to vehicle speed; "RPM" refers to drive motor speed; "GR" refers to speed ratio of a CVT 406. "Act Pos" refers to the position of the shift rod in encoder counts.

In one embodiment, a method of controlling a drivetrain of an EV provides for an economy mode and a performance mode. In economy mode, the control system 18 is configured to control a prime mover, for example the drive motor 404, in the following manner. The control system 18 allows the current to the drive motor 404 to have an initial maximum current peak (that is, current limit), for example 30-Amps. This initial maximum current peak can be held for a predetermined amount of time (for example 2-seconds), which amount of time, in some cases, is preferably sufficient to allow the drive motor 404 to achieve its base speed, said base speed being the speed of the drive motor 404 above which the drive motor 404 produces constant power at increasing drive motor speed and decreasing drive motor torque, a state wherein the drive motor 404 typically operates at higher efficiency than at lower drive motor speeds. Thereafter, the control system 18 manages current to the drive motor 404 such that the current is delivered to the drive motor 404 only up to a predetermined current limit (for example, 25-Amps), which can be sustained as long as required by, for example, throttle command (or user input). In some embodiments, the power (or current) supplied to the drive motor 404 is a function of throttle position and battery voltage. In economy mode, the control system 18 is configured to control the CVT 406 in a fashion that allows the drive motor 404 to arrive at its base speed as quickly as possible, and then the control system controls the CVT 406 to maintain the CVT 406 at a ratio of peak efficiency for the given operating conditions (for example, in certain CVTs the peak efficiency is found at a speed ratio of 1:1).

In one embodiment, the control system 18 is configured to optimize the overall efficiency of the drivetrain of the EV. The drivetrain overall efficiency is a function of the efficiency of the drive motor 404, the efficiency of the CVT 406, the efficiency of the control system 18 itself, and/or an indication of how battery life is affected at certain operating conditions. Hence, in some embodiments, the control system 18 is configured to modulate power (or current) to the drive motor 404 and to modulate the ratio of the CVT 406 (preferably in conjunction with the power modulation) based upon certain inputs, which can include one or more of the following: throttle position, throttle position rate of change (with respect to time), control system mode (for example, economy, performance, manual, simulation of stepped transmission, etc.), average or instantaneous battery voltage, average or instantaneous state of charge of the battery, data indicative of battery life versus current draw over time, average or instantaneous drive motor current draw, average or instantaneous speed of the vehicle, ratio of the CVT 406, data indicative of the efficiency of the CVT 406 versus speed of the EV and/or CVT 406 speed ratio, speed of the drive motor 404, data indicative of the efficiency of the drive motor 404 versus torque and/or speed of the drive motor 404, and efficiency of the control system 18 (such as data indicative of power use by the control circuitry for the shift actuator 418 and/or the drive motor 404). In certain embodiments, the control system 18 is configured to control the ratio of the CVT 406 as a function of one or more of the speed of the EV, speed of the drive motor 404, battery voltage, and current draw (that is current provided to the drive motor 404, which can in some cases be based on throttle position).

Figure 14:
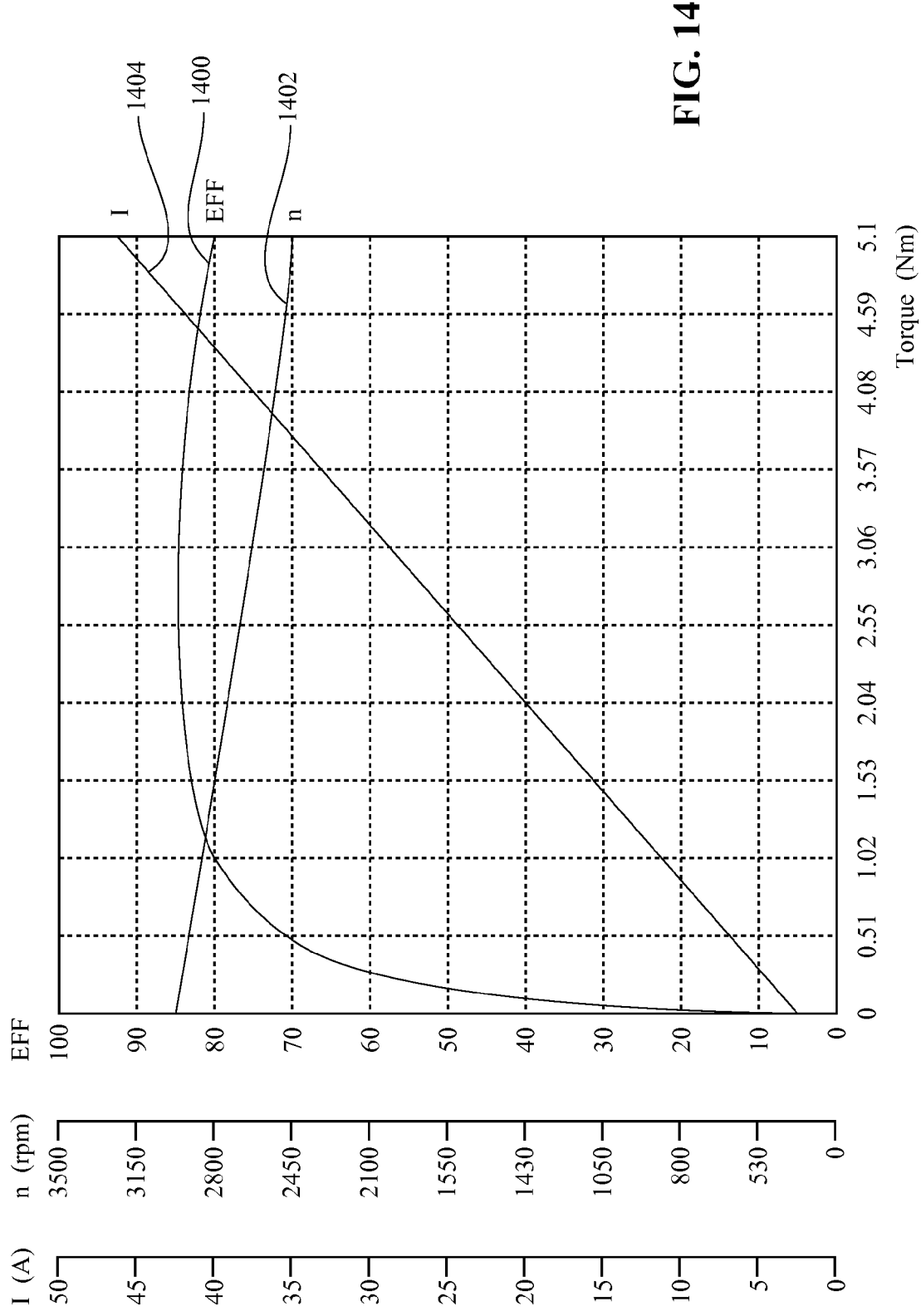
FIG. 14 is a chart depicting certain operating characteristics of a drive motor that can be used in the drive system of FIG. 4.
Figure 15:
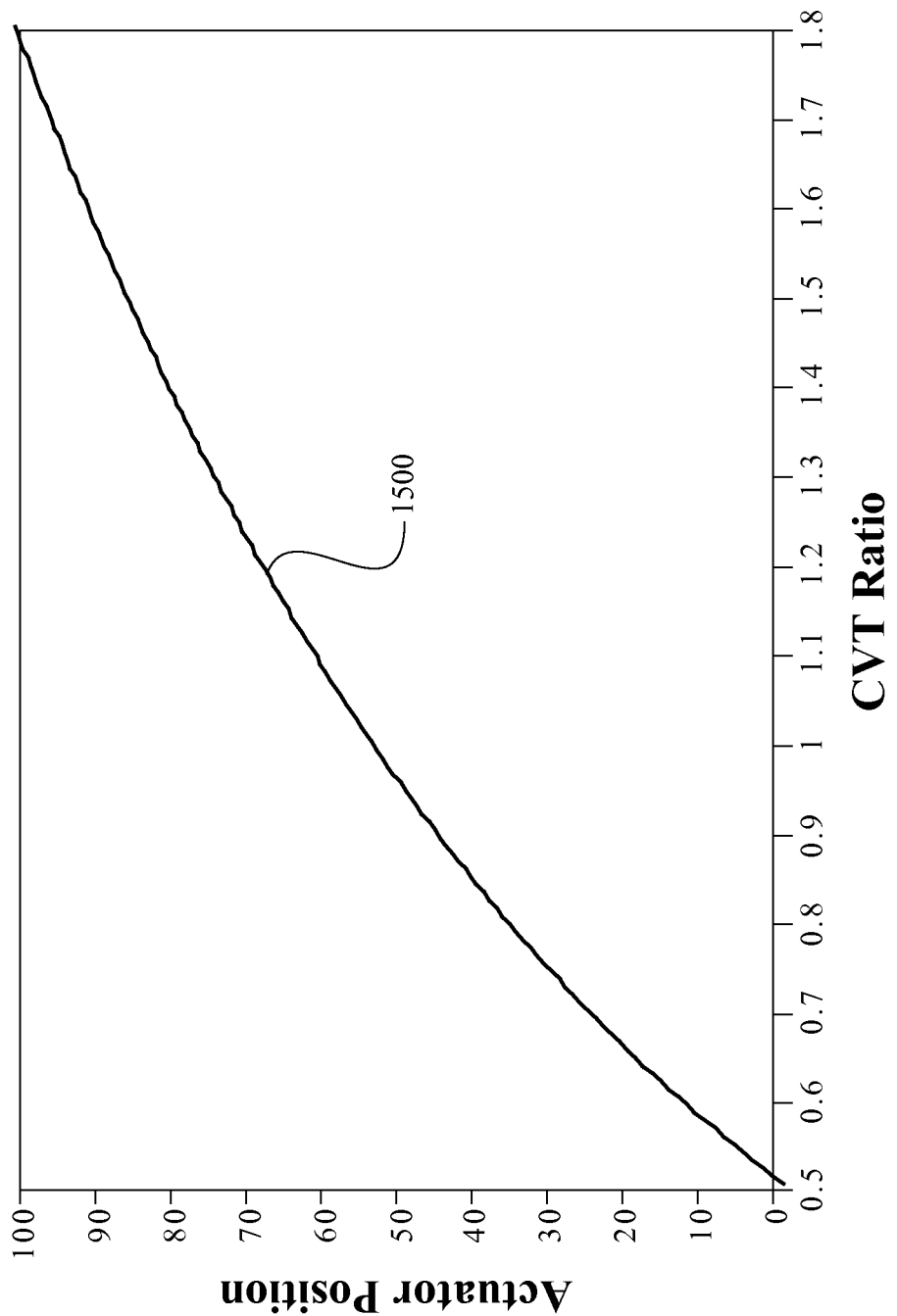
FIG. 15 is a chart depicting a relationship between a shift actuator position and a CVT ratio that can be used with the process of FIG. 10.
Figure 16:
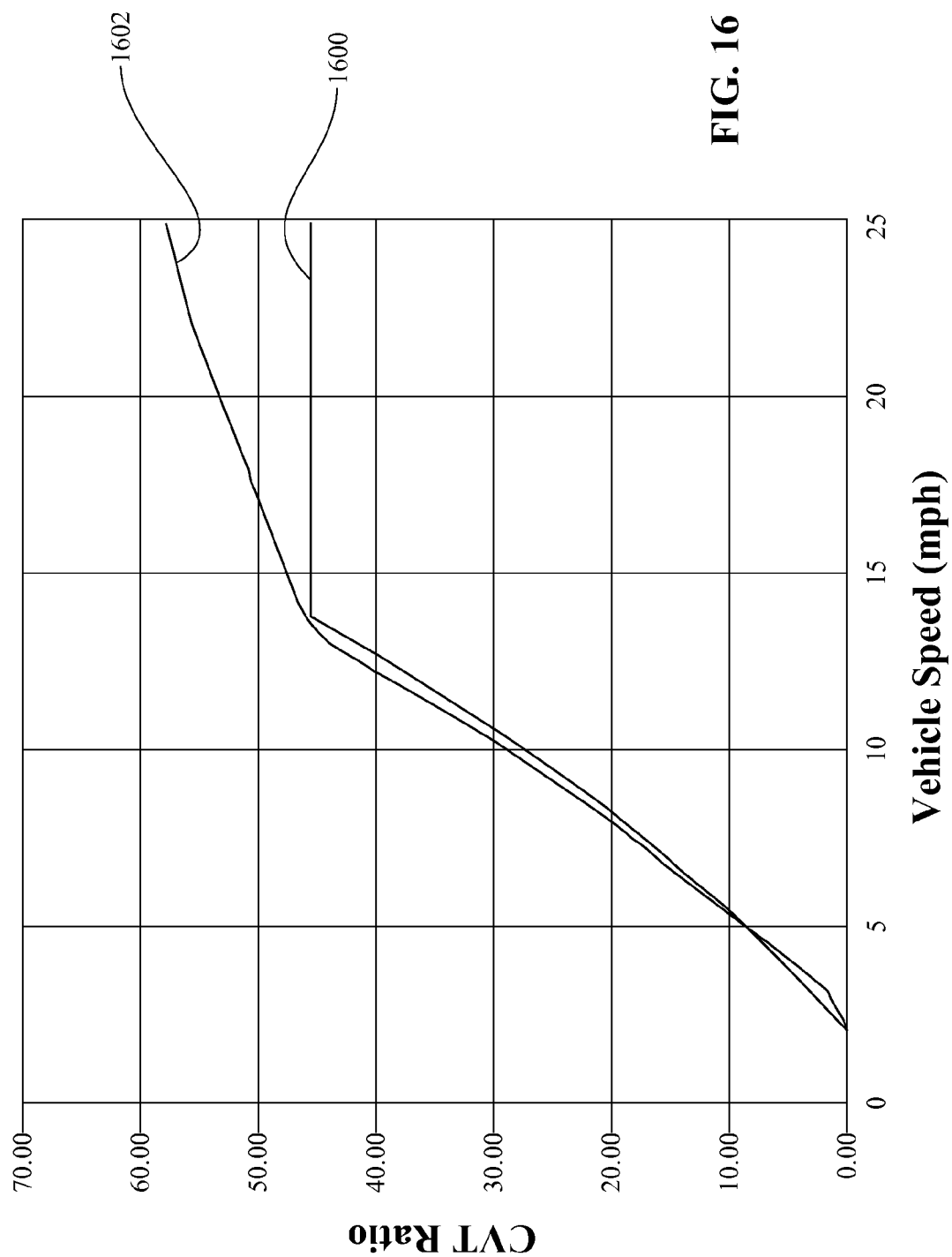
FIG. 16 is a chart of a speed ratio of a CVT versus vehicle speed; the chart can be used with the subprocesses of FIG. 10 for determining speed ratio of a CVT.
Figure 17:
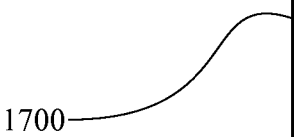
FIG. 17 is a data table relating a desired vehicle speed to a desired motor current draw.

Referring now to FIGS. 14-16, in one embodiment a method for optimizing the overall efficiency of a drive system, for example the drive system 400, can include calibrating the economy mode shift curve 3204 of the shifter process 2902. The method can utilize the characteristic performance of the drive motor 404, an example of which is depicted in the chart of FIG. 14. In this embodiment, the drive motor 404 is a 36V DC brushed motor having peak efficiency at relatively high speeds and low torques, for example between 2625 rpm and 2800 rpm and between 1 and 4.5 Nm. The characteristic efficiency of the drive motor 404 can be represented by curve 1400 in the chart of FIG. 14. Also shown in FIG. 14 are a characteristic speed curve 1402 and a characteristic current curve 1404. The chart of FIG. 14 shows that the drive motor 404 achieves an optimum efficiency in a current range between 12 A and 46 A. However, the battery and/or vehicle range may decrease for current draw above 28 A. Therefore, it is desirable to calibrate the economy mode shift curve 3204 so that the drive motor 404 operates in this current range of 12 A-28 A.

As previously discussed, the ratio of the CVT 406 (FIG. 5) can be controlled by the shift actuator 418. An exemplary relationship between the ratio of the CVT 406 and a position of the shift actuator 418 can be represented by a curve 1500 in FIG. 15. The curve 1500 can be approximated with the equation: y=80.841 Ln(x)+52.998, where y is the position of the shift actuator 418 and x is the ratio of the CVT 406. Of course, a person of ordinary skill in the relevant technology will recognize that the specific, preceding equation is associated with a particular set of hardware (such as a particular vehicle, a particular drive motor 404, a particular shift actuator 418, etc.). However, the person of ordinary skill in the relevant technology will also recognize that a general relationship between CVT ratio and shift actuator position can be generally described by a logarithmic equation of the form y=ALn (x)+B, with the coefficients A and B having values determined by the particular hardware of a given application. The curve 1500 and corresponding equation can be used to generate a relationship between the position of the shift actuator 418, for example encoder counts, and the current draw from the drive motor 404. Moreover, because the speed of the drive motor 404 is directly linked to the current draw of the drive motor 404, and because the speed of the drive motor 404 is related to the vehicle speed, or the wheel speed, it is possible to determine the current draw for given a wheel speed.

In one embodiment, the relationship between the current draw and the wheel speed can be determined by experimentation. The CVT 406 can be configured to be manually shifted, for example by being operated in manual mode. The vehicle can be ridden while monitoring the current draw. Adjustment of the ratio of the CVT 406 can be made manually to limit the current draw of the motor to between 15 A and 20 A. The vehicle speed and the ratio of the CVT 406 can be represented by a curve 1600. Other considerations can be taken into account when formulating the relationship between the ratio of the CVT 406 and the vehicle speed. For example, vehicle acceleration and top speed characteristics, as well as downhill operating characteristics, may be factored into the calibration of a shift curve of the shifter process 2902. When these operating conditions are taken into account, the relationship can be represented by an exemplary curve 1602 in FIG. 16. The slope of the curve 1602 at low speed (for example, 2-3 MPH) may be less steep than the curve 1600, which results in less torque transfer from the drive motor 404 for a smoother take off. The curve 1602 can have a steeper slope compared to the curve 1600 between 5 MPH and 15 MPH to achieve higher acceleration. The curve 1602 can have a steeper slope compared to the curve 1600 that begins around 14.5 mph, which can provide an increase in the top speed of the vehicle. This increase in top speed can allow the vehicle to increase speed slightly when going down hill. The curves 1600 and/or 1602 can be used in the shifter process 2902.

Figure 18:
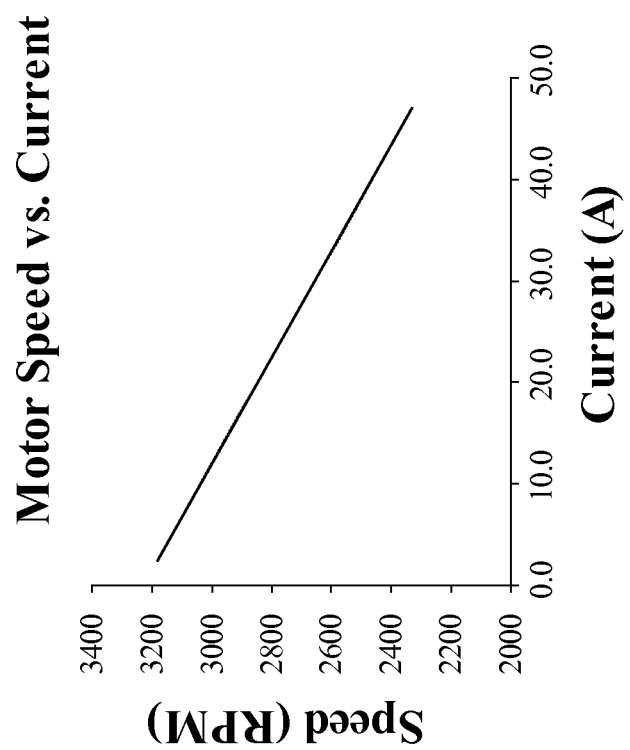
FIG. 18 is a chart representing a relationship between a motor speed and a motor current.
Figure 20:
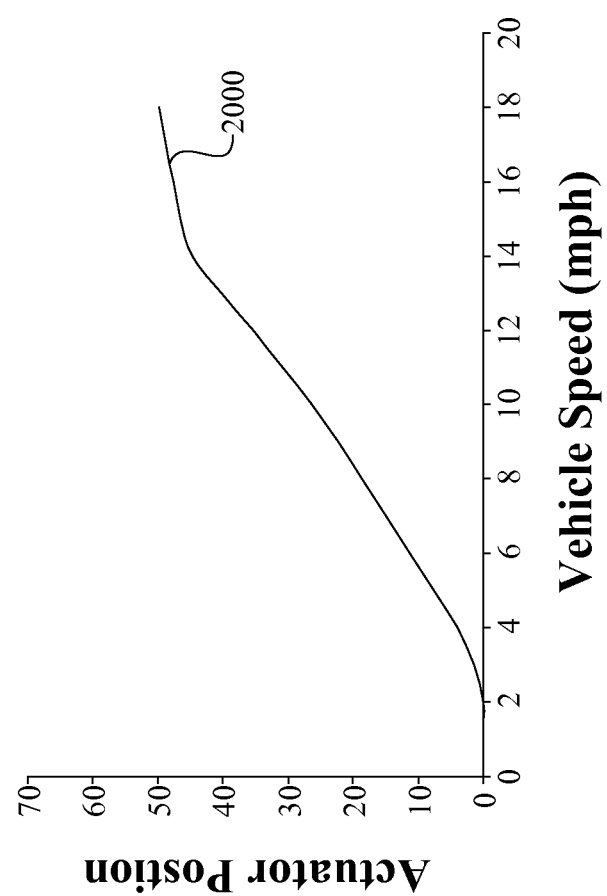
FIG. 20 is a chart of actuator position of a CVT versus vehicle speed that can be used with the subprocess of FIG. 10 for determining a speed ratio of a CVT.

Referring to FIGS. 17-20, a method of determining the relationship between the current draw of the drive motor 404 and a vehicle speed can be determined analytically. The method includes establishing a relationship between the current draw of the drive motor 404 and the desired vehicle speed, such as the relationship represented in a data table 1700 shown in FIG. 17. At low speeds the current draw is relatively high to facilitate starting the drive motor 404 from a stall condition. As the vehicle speed increases from a stop, the current draw decreases from a maximum current to a current in the range of about 10-25 A. The speed of the drive motor 404 is proportional to current draw, which is shown in FIG. 18. Therefore, the speed of the drive motor 404 corresponding to the desired vehicle speed can be calculated based on the current draw. The results of an example calculation are shown in FIG. 19 in the column labeled "motor speed RPM".

A calculation for the input speed of the CVT 406 can be made based on the ratio of the sprocket 412 and the pinion 408, which ratio is about 0.17 in one embodiment. The input speed to the CVT 406 from the drive motor 404 is listed in the column of FIG. 19 labeled "CVT Input Speed mph". The position of the shift actuator 418 for the optimum ratio of the CVT 406 can then be determined by relating the desired speed to the input speed of the CVT 406 to derive a CVT ratio and applying the relationship illustrated in FIG. 15, which shows the position of the shift actuator 418 versus the ratio of the CVT 406. The result of performing such a derivation can be represented by the curve 2000 of FIG. 20, for example. The curve 2000 can be approximated by the expression $y=-0.0003x^4-0.0095x^3+0.4532x^2-0.5388x-0.1846$, where y is the position of the shift actuator 418 and x is the vehicle speed. The curve 2000 can be used with the shifter process 2902.

Figure 21:
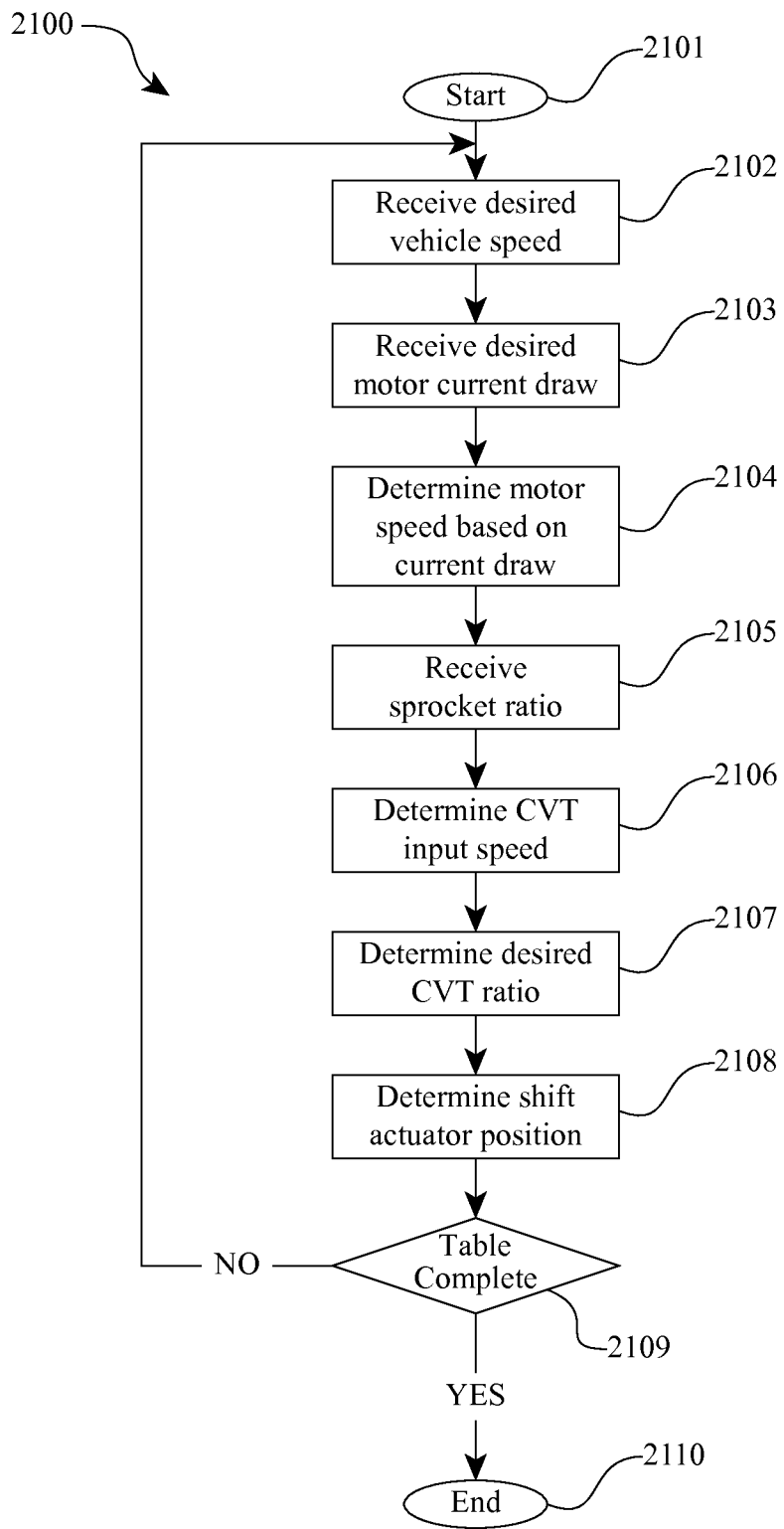
FIG. 21 is a flowchart of an exemplary process having certain inventive features for generating a calibration map relating a desired vehicle speed to a desired motor current draw.

Turning now to FIG. 21, in one embodiment a method for optimizing the overall efficiency of a drive system, for example the drive system 10, can include a process 2100 for generating an economy mode table that can be used in the shifter process 2902. The process 2100 can be configured to be performed at least in part on a computing device or on any microprocessor known in the relevant technology. The process 2100 begins at a state 2101 and proceeds to a state 2102, wherein a desired vehicle speed is received as an input variable. The process 2100 then proceeds to a state 2103, wherein a desired motor current draw is received as an input variable. Next, the process 2100 proceeds to a state 2104 to determine the drive motor speed based at least in part on the motor current draw. At a state 2105, a sprocket ratio of the drive system 10 is received as an input variable. The process 2100 proceeds to a state 2106 to determine the input speed of a CVT, for example the CVT 14 of the drive system 10. The input speed of the CVT 14 can be determined at least in part by the determined motor speed and the received sprocket ratio. Next, the process 2100 proceeds to a state 2107 where the desired ratio of the CVT 14 is determined based at least in part on the received desired vehicle speed and the determined input speed of the CVT 14. The process 2100 then enters a state 2108 to determine the position of a shift actuator, for example the shift actuator 418. The position of the shift actuator 418 can be based at least in part on the determined desired ratio of the CVT 14. In some embodiments, the relationship depicted in FIG. 15 between the position of the shift actuator 418 and the ratio of the CVT 14 can be used in the state 2108. The process 2100 proceeds to a decision state 2109 that evaluates the completeness of the economy mode table. If the economy mode table is incomplete, the process 2100 is repeated beginning at the state 2102. If the table is complete, the process 2100 ends at a state 2110.

Figure 22:
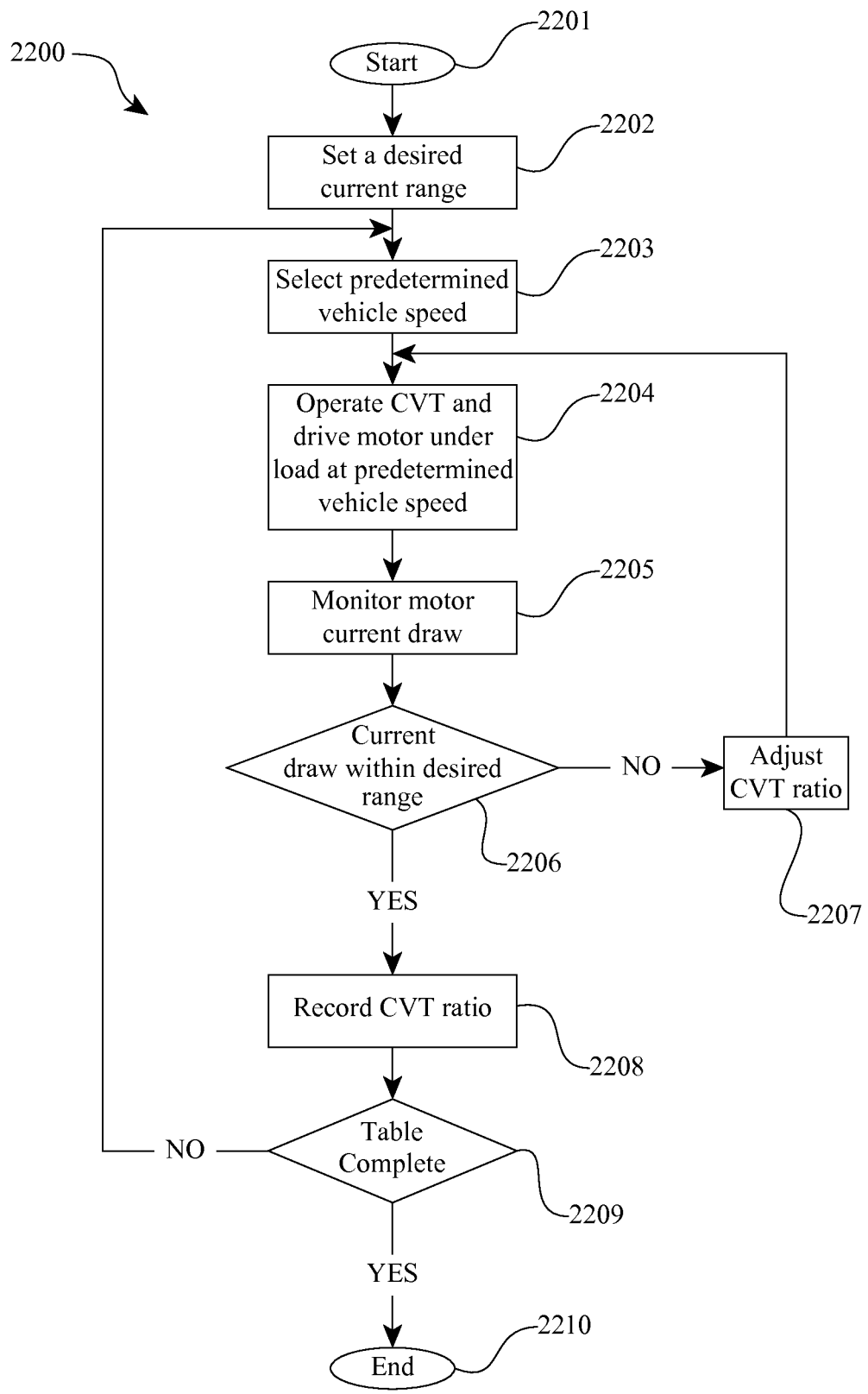
FIG. 22 is a flowchart of another exemplary process having certain inventive features for generating a calibration map relating a desired vehicle speed to a desired motor current draw.

Referring now to FIG. 22, optimization of the overall efficiency of the drive system 10 can include a process 2200 for generating an economy mode table that can be used in the shifter process 2902. The process 2200 can be performed experimentally using a vehicle or a test stand suitably configured to apply a load to certain components of the drive system 10. The process 2200 begins at a state 2201 and proceeds to a state 2202, wherein a desired range for the current draw of the prime mover 12 is set. The process 2200 then proceeds to a state 2203, wherein a predetermined vehicle speed is selected. For example, a vehicle speed of 14.5 mph can be selected. Next, the process 2200 enters a state 2204 where the CVT 14 and the prime mover 12 are operated under load at the predetermined vehicle speed selected in the state 2203. The process 2200 proceeds to a state 2205 where the current draw of the prime mover 12 is monitored. At a decision state 2206, the current draw observed in the state 2205 is compared to the desired range for the current draw set in the state 2202. If the current draw observed in the state 2205 is not within the desired range, the process 2200 proceeds to a state 2207 where an adjustment is made to the ratio of the CVT 14. If the current draw observed in the state 2205 is within the desired range, the process 2200 proceeds to a state 2208 where the ratio of the CVT 14 is recorded. Next, the process 2200 proceeds to the decision state 2209 to evaluate the completeness of the economy mode table. If the economy mode table is incomplete, the process 2200 is repeated beginning at the state 2203. If the economy mode table is complete, the process 2200 proceeds to an end state 2210.

Those of skill will recognize that the various illustrative logical blocks, modules, circuits, and algorithm steps described in connection with the embodiments disclosed herein, including with reference to the control system 18, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, the controller 20 comprises a processor (not shown).

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A vehicle comprising:
   a drive motor;
   a continuously variable transmission (CVT), the CVT having a plurality of spherical power adjusters, each power adjuster having a liftable axis of rotation; and
   a processor coupled to a memory storing a data structure and a set of instructions executable by the processor to perform
     receiving, from a user interface, an indication of a desired operating mode selected from a plurality of operating modes, wherein at least one operating mode allows the vehicle to operate in an efficiency mode and at least one operating mode allows the vehicle to operate in a performance mode,
     receiving an input associated with a desired vehicle speed,
     receiving an input associated with a motor speed,
     receiving information associated with the CVT, wherein information includes information from a speed sensor and information from an actuator position sensor,
     determining an input speed to the CVT based at least in part on the motor speed and the information associated with the CVT to achieve the desired vehicle speed, and
     adjusting a ratio of the CVT based on one or more predefined parameters.

2. The vehicle of claim 1, wherein adjusting a ratio of the CVT comprises:
   monitoring a sensor to determine the current draw of the drive motor when operating the CVT and the drive motor at the desired vehicle speed;
   comparing the motor current draw to a desired range of current; and
   adjusting a ratio of the CVT based at least in part on the comparison of the motor current draw to a desired motor current draw and the desired vehicle speed.

3. The vehicle of claim 1, wherein receiving an input associated with a motor speed comprises:
   receiving an input associated with a motor current draw; and
   determining, from a table stored in the memory, a motor speed associated with the motor current draw.

4. The vehicle of claim 1, wherein determining an input speed to the CVT comprises creating a table indicative of the relationship between motor current draw and vehicle speed.

5. The vehicle of claim 4, wherein creating a table comprises operating the vehicle for a range of vehicle operating speeds and creating a plurality of tables, wherein each table is created for a predetermined operating parameter of the vehicle.

6. The vehicle of claim 1, wherein receiving an input associated with a desired vehicle speed comprises reading a throttle position.

7. A method of optimizing a vehicle having a drive motor and a continuously variable transmission (CVT), the CVT having a plurality of spherical power adjusters, each power adjuster having a tiltable axis of rotation, and a controller coupled to a memory storing a set of instructions, the method comprising the controller performing the steps of:
   receiving, from a user interface, an indication of a desired operating mode selected from a plurality of operating modes, wherein at least one operating mode allows the vehicle to operate in an efficiency mode and at least one operating mode allows the vehicle to operate in a performance mode;
   receiving an input associated with a desired vehicle speed;
   receiving an input associated with a motor speed;
   receiving information associated with the CVT, wherein information information from a speed sensor and information from an actuator position sensor;

determining an input speed to the CVT based at least in part on the motor speed and the information associated with the CVT to achieve the desired vehicle speed; and adjusting a ratio of the CVT based on one or more predefined parameters.

8. The method of claim 7, wherein adjusting a ratio of the CVT comprises:

monitoring a sensor to determine the current draw of the drive motor when operating the CVT and the drive motor at the desired vehicle speed;

comparing the motor current draw to a desired range of current; and adjusting a ratio of the CVT based at least in part on the comparison of the motor current draw to a desired motor current draw and the desired vehicle speed.

9. The method of claim 7, wherein receiving an input associated with a motor speed comprises:

receiving an input associated, with a motor current draw; and determining, from a table stored in the memory, a motor speed associated with the motor current draw.

10. The method of claim 7, wherein determining an input speed to the CVT comprises creating a table indicative of the relationship between motor current draw and vehicle speed.

11. The method of claim 10, wherein creating a table comprises operating the vehicle for a range of vehicle operating speeds and creating a plurality of tables, wherein each table is created for a predetermined operating parameter of the vehicle.

12. The method of claim 11, wherein the plurality of tables includes at least one table comprises a mode table for operating, the vehicle.

13. The method of claim 7, wherein receiving an input associated with a desired vehicle speed comprises reading a throttle position.

* * * * *